(12) United States Patent
Kim et al.

(10) Patent No.: US 7,478,942 B2
(45) Date of Patent: Jan. 20, 2009

(54) LIGHT GUIDE PLATE WITH LIGHT REFLECTION PATTERN

(75) Inventors: Dong-Hoon Kim, Suwon-si (KR); Jong-Dae Park, Seoul (KR); Kyu-Seok Kim, Yongin-si (KR); Jeong-Hwan Lee, Suwon-si (KR); Jae-Ho Jung, Yongin-si (KR); Man-Suk Kim, Suwon-si (KR); Chul-Goo Chi, Seoul (KR); O-Yong Jeong, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/648,523

(22) Filed: Aug. 26, 2003

(65) Prior Publication Data

US 2004/0145915 A1    Jul. 29, 2004

(30) Foreign Application Priority Data

Jan. 23, 2003  (JP)  .............. 10-2003-0004629
Jun. 27, 2003  (JP)  .............. 10-2003-0042603

(51) Int. Cl.
*G09F 13/18*  (2006.01)
*G02F 1/13357*  (2006.01)

(52) U.S. Cl. ............... 362/620; 362/626; 362/559; 362/561; 349/65; 40/546

(58) Field of Classification Search ............... 362/31, 362/560, 330, 551, 558, 559, 561, 257, 296–300, 362/339; 385/129, 130, 132; 349/65, 56, 349/61, 62; 40/546, 547, 361, 366, 367, 40/541

See application file for complete search history.

(56) References Cited

U.S. PATENT DOCUMENTS 4,729,068 A * 3/1988 Ohe .......................... 362/615

(Continued)

FOREIGN PATENT DOCUMENTS

CN    2457630    10/2001

(Continued)

OTHER PUBLICATIONS

"Official Letter" from Taiwan Intellectual Property Office and Search Report of R.O.C. patent application No. 092123757 (and English translations thereof; dated Jul. 6, 2007.

*Primary Examiner*—Ismael Negron
(74) *Attorney, Agent, or Firm*—Cantor Colburn LLP

(57) ABSTRACT

A light guide plate includes a light incident surface for receiving light, first and second light emission surfaces for emitting light at a first light emission angle with respect to the first and second light emission surfaces, and a light reflection pattern formed on the first light emission surface, for reflecting the light toward the second light emission surface. The reflected light from the light reflection pattern exits the second light emission surface at a second light emission angle with respect to the second light emission surface, and the second light emission angle is larger than the first light emission angle. The light reflection pattern includes multiple dots each having a prim pattern on their surface and light reflecting surfaces elongated in a selected direction. The adjacent light reflecting surfaces meet each other at their elongated edges to form a prism shape.

23 Claims, 30 Drawing Sheets

U.S. PATENT DOCUMENTS

| | | | |
|---|---|---|---|
| 4,811,507 A * | 3/1989 | Blanchet | 40/546 |
| 5,134,549 A * | 7/1992 | Yokoyama | 362/623 |
| 5,136,480 A * | 8/1992 | Pristash et al. | 362/618 |
| 5,390,436 A * | 2/1995 | Ashall | 40/546 |
| 5,600,455 A * | 2/1997 | Ishikawa et al. | 362/617 |
| 5,667,289 A * | 9/1997 | Akahane et al. | 362/31 |
| 6,086,211 A | 7/2000 | Ohkawa | |
| 6,334,689 B1 * | 1/2002 | Taniguchi et al. | 362/31 |
| 6,425,673 B1 * | 7/2002 | Suga et al. | 362/613 |
| 6,454,452 B1 * | 9/2002 | Sasagawa et al. | 362/561 |
| 6,486,931 B1 * | 11/2002 | Ueda | 362/31 |
| 6,522,373 B1 * | 2/2003 | Hira et al. | 362/31 |
| 6,530,671 B2 * | 3/2003 | Taniguchi et al. | 362/31 |
| 6,742,907 B2 * | 6/2004 | Funamoto et al. | 362/625 |
| 6,843,587 B2 * | 1/2005 | Park et al. | 362/31 |
| 6,863,414 B2 * | 3/2005 | Ho | 362/603 |
| 2002/0181223 A1 * | 12/2002 | Ryu et al. | 362/31 |
| 2004/0125588 A1 * | 7/2004 | Ho | 362/31 |

FOREIGN PATENT DOCUMENTS

| | | |
|---|---|---|
| JP | 3005726 | 1/1991 |
| JP | 11-337943 | 12/1999 |
| JP | 2000-292787 | 10/2000 |
| JP | 2000294022 | 10/2000 |
| JP | 2001093316 | 4/2001 |
| JP | 2001250412 | 9/2001 |
| JP | 2001281459 | 10/2001 |
| JP | 2001-345007 | 12/2001 |
| TW | 417035 | 1/2001 |

\* cited by examiner

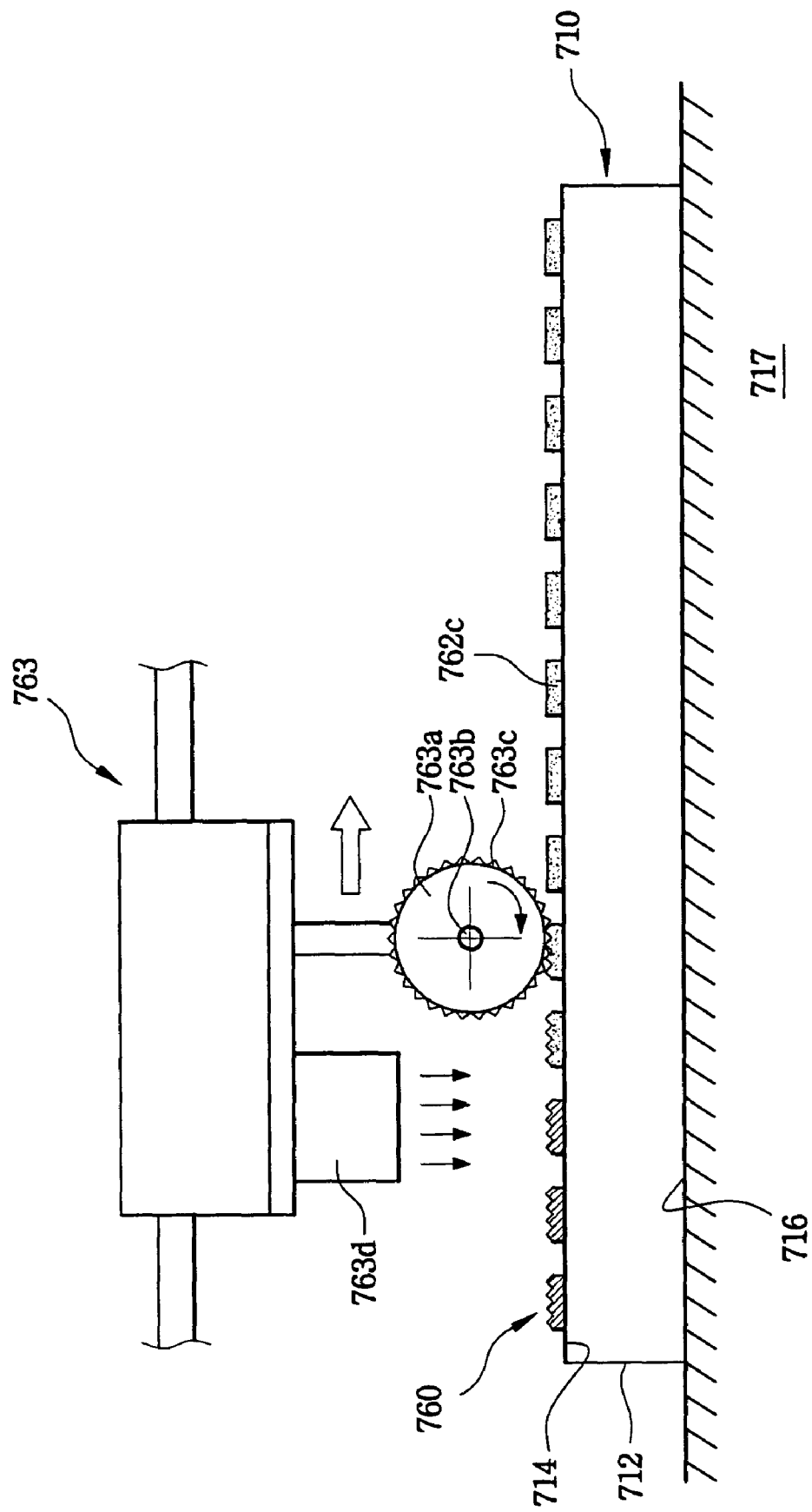

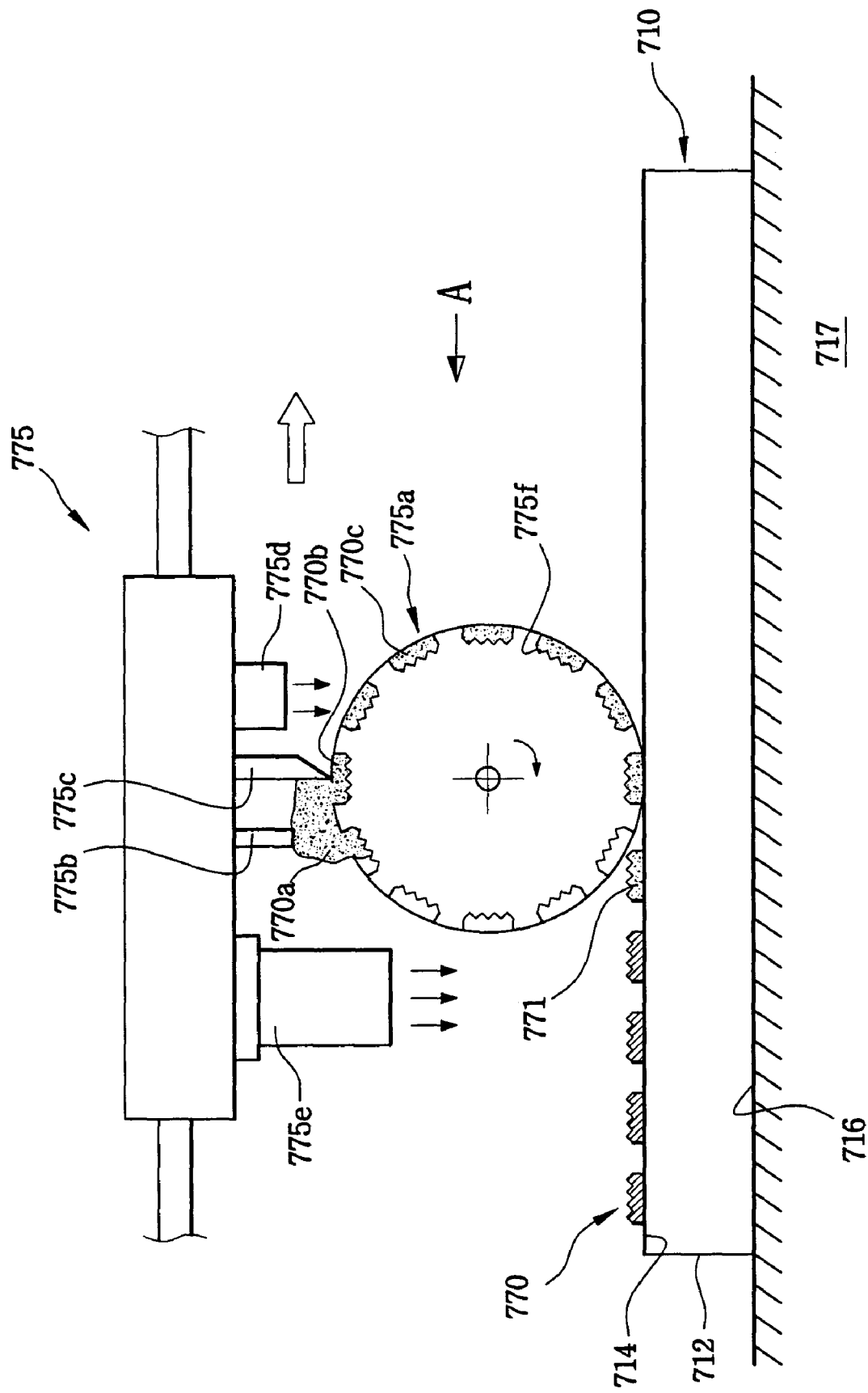

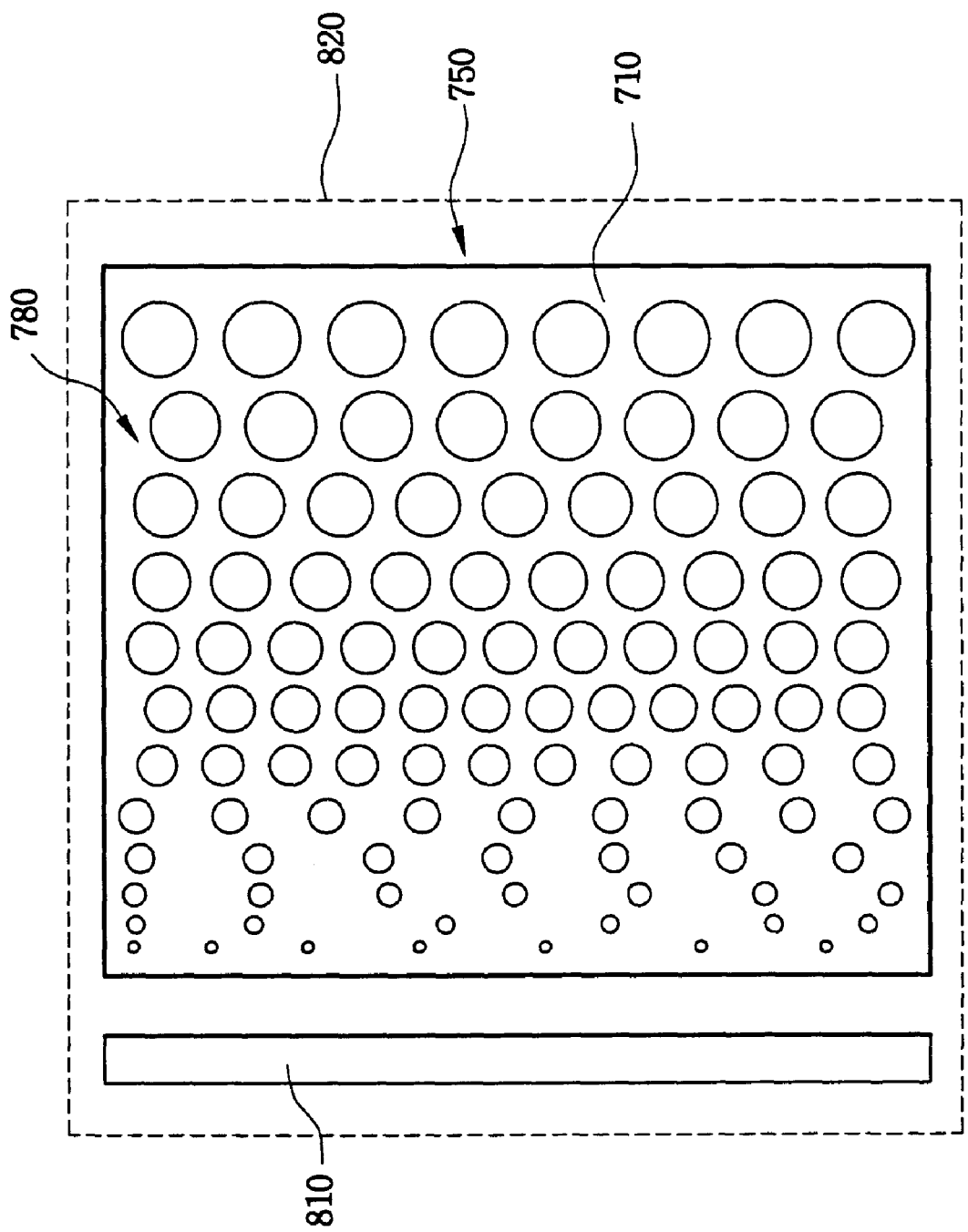

LIGHT GUIDE PLATE WITH LIGHT REFLECTION PATTERN

BACKGROUND OF THE INVENTION

1. Field of the Invention

The present invention relates to a plate for guiding light traveling therein, more particularly, to a light guide plate for providing light with uniform luminance distribution to be used for image display devices and a method of fabricating the light guide plate.

2. Description of the Related Art

A light guide plate is generally used inside a light equipment, or a backlight unit, that leads the light to a display equipment in an image display device. In a display device such as a liquid crystal display (LCD) device, a light guide plate is employed to guide and adjust paths of the light provided from a light source to produce light having uniform luminance distribution. Since liquid crystal in an LCD device emits no light, light is generated from a light source and then provided to the liquid crystal through a light guide plate.

An LCD device generally has a device for displaying images, a device for controlling the liquid crystal, and a device for supplying the light. The liquid crystal controlling device controls the transmission of light in the liquid crystal by applying electric field to liquid crystal molecules. In other words, applying electric field to the liquid crystal molecules will untwist them to varying degrees, depending on the current's voltage. LCD devices use such liquid crystal because it reacts predictably to electric current in such a way as to control light passage.

The light supplying device is to provide the liquid crystal with light having uniform brightness. The light supplying device has a light source and a light guide plate for producing the light. Typically, a light source in the light supplying device generates linear light having non-uniform optical distribution. Thus, the light guide plate converts such a light into planar light having uniform optical distribution to be provided to the liquid crystal. However, the conventional light guide plates have drawbacks such as decrease in the luminance on a display panel of the LCD device.

To increase the luminance, various types of light guide plates have been developed such as a light guide plate having diffusion dots on its reflection surface to increase the quantity of light exiting the light guide plate, as known to those skilled in the art.

Also, the light traveling in the light guide plate may be reflected by one surface of the light guide plate and exits another surface of the light guide plate. In this case, under the Snell's refraction law, the light exiting the light guide plate cannot have an exit angle perpendicular to the light exit surface of the light guide plate. It results in a decrease of the luminance on a display panel of the LCD device.

In order to make the light exit angle greater (i.e., closer to 90°), the conventional light supplying devices employ various types of optical sheets on the light guide-plate. For instance, a diffusion sheet is disposed on the light guide plate to increase the light exit angle, and a prism sheet is further disposed on the diffusion sheet to increase an exit angle of the light exiting the diffusion sheet.

Although the diffusion sheets and prism sheets may enhance the luminance on a display panel of the LCD device, they causes such problems as increasing the overall weight and volume of an LCD device and also increasing the manufacturing cost of an LCD device because of the additional components.

Therefore, a need exists for a light guide plate for maximizing the luminance on a display panel of an LCD device without increasing the number of components for the LCD device. Further, it will be advantageous to provide a method of fabricating such light guide plates in a simpler process and in a mass production process.

SUMMARY OF THE INVENTION

The above-discussed and other drawbacks and deficiencies of the prior art are overcome or alleviated by a light guide plate of the present invention and an LCD device employing the light guide plate. In one embodiment, a light guide plate of the present invention includes a light incident surface for receiving light, first and second light emission surfaces for emitting light at a first light emission angle with respect to the first and second light emission surfaces, and a light reflection pattern formed on the first light emission surface, for reflecting light toward the second light emission surface. The reflected light from the light reflection pattern exits the second light emission surface at a second light emission angle with respect to the second light emission surface. The second light emission angle is preferably larger than the first light emission angle.

Also, the light reflection pattern may include a plurality of dots having a prism pattern on their surface. The dots may have different sizes such that the more distant is a dot from the light incident surface, the larger is the dot. The light reflection pattern may have different densities of the dots at different areas on the first light emission surface such that the closer is an area of the light reflection pattern to the light incident surface, the higher is a density of the dots at the area. The dots each have light reflecting surfaces elongated in a selected direction, wherein adjacent ones of the light reflecting surfaces meet each other at elongated edges of the adjacent light reflecting surfaces to form an angle between the adjacent reflecting surfaces.

In another embodiment of the present invention, provided is a backlight assembly for providing light with uniform luminance, which includes the above-mentioned light guide plate, a light source for providing light to the light incident surface of the light guide plate, and a receiving container for receiving the light guide plate and the light source. The backlight assembly may also include a second light source for providing light to a second light incident surface of the light guide plate. In this case, the dots of the light reflection pattern may have different sizes such that the closer is a dot to one of the light incident surfaces, the smaller the dot is.

In another embodiment, an LCD device is provided for displaying images. The LCD device includes the above-mentioned backlight assembly, a display panel for receiving the light from the backlight assembly to display the images, and a chassis for securing the display panel with the backlight assembly.

In another embodiment, a molding apparatus is provided for fabricating the light guide plate. The molding apparatus includes a lower mold having a plurality of recessed dots each having a shape corresponding to the dots of the light reflection pattern, an upper mold having side walls to be combined with edges of the lower mold to form an empty space within the upper and lower molds, and an inlet for injecting indurative material into the empty space.

The present invention also provides a method of fabricating the above-mentioned light guide plate. The method includes the steps of preparing a body of the light guide plate, which has surfaces including a light incident surface and light emission surfaces, placing a pattern mask on a first light emission surface, in which the pattern mask has a plurality of openings, filling the openings with material having fluidity, first curing the material, removing the pattern mask to form a plurality of dots of the first cured material, forming a pattern on surfaces of the dots of the first cured material, and second curing the dots of the first cured material to form solid dots with the pattern. The method may also include the steps of scraping the material disposed on the pattern mask to level the material with surface of the pattern mask, and forming the openings of the pattern mask in different sizes such that a size of an opening is inversely proportional to a distance between the opening and the light incident surface of the body.

In another aspect of the present invention, a method of fabricating a light guide plate includes the steps of preparing a body of the light guide plate, which has surfaces including a light incident surface and light emission surfaces, forming recesses with a pattern on a roller disposed on a first light emission surface of the body, filling the recesses with material having fluidity, first curing the material having fluidity, rotating the roller to proceed forward so that the first cured material is separated from the recesses and a plurality of dots of the first cured material is formed on the first light emission surface, and second curing the dots of the first cured material to form solid dots with the pattern. The method may also include the step of forming elongated surfaces of a prism shape on the surfaces of the dots, the elongated surfaces of a prism shape reflecting light from the light incident surface toward a second light emission surface.

By employing the above-described features of the light guide plate according to the present invention, one or more prism sheets that were required in the conventional LCD devices may be no longer necessary in the LCD device of the present invention, and the display deterioration due to the light interference between a prism sheet and a display panel, such as moiré phenomenon, in the conventional LCD devices may also be effectively eliminated in the LCD device according to the present invention because the LCD device of the present invention does not require a prism sheet.

BRIEF DESCRIPTION OF THE DRAWINGS

This disclosure will present in detail the following description of exemplary embodiments with reference to the following figures, wherein:

FIG. 13G shows a process of forming a pattern on the first cured material dots;

FIG. 14A shows a method of fabricating a light guide plate according to another embodiment of the present invention;

FIG. 18 is a schematic diagram illustrating a light guide plate applicable to the backlight assembly in FIG. 16;

DETAILED DESCRIPTION OF THE INVENTION

Detailed illustrative embodiments of the present invention are disclosed herein. However, specific structural and functional details disclosed herein are merely representative for purposes of describing preferred embodiments of the present invention.

Figure 1:
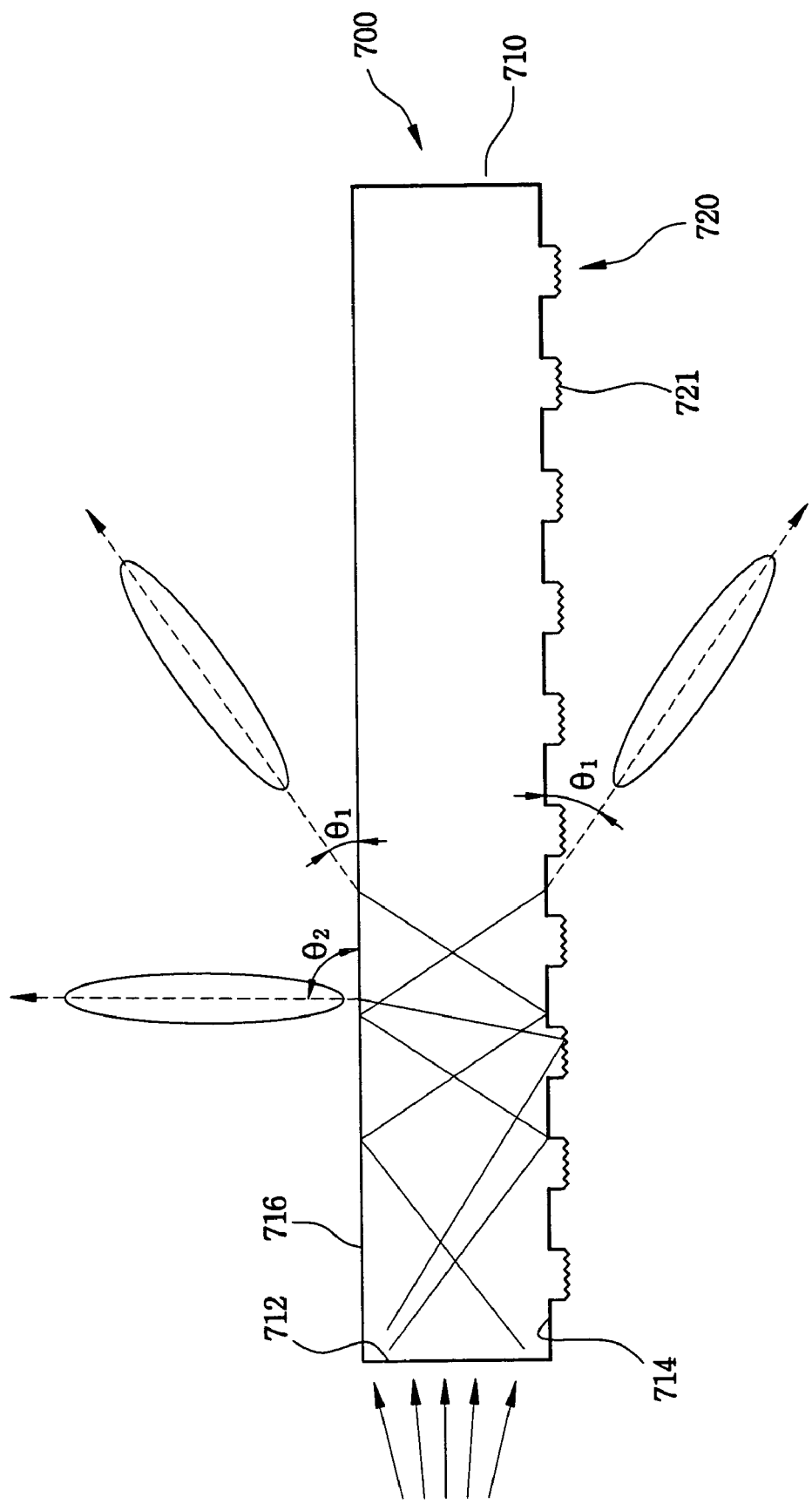
FIG. 1 is a schematic cross-sectional view of a light guide plate according to an embodiment of the present invention.

FIG. 1 is a schematic cross-sectional view of a light guide plate according to an exemplary embodiment of the present invention. The light guide plate 700 has a body 710 with multiple surfaces of which number depends on a shape of the body. In other words, the body 710 may have a triangular plate shape with three side surfaces (in addition to top and bottom surfaces), a rectangular plate shape with four side surfaces, or a polygonal plate shape with five or more side surfaces.

In this embodiment, for example, the body 710 has a hexahedral shape including first and second surfaces 714, 716 facing each other and a side surface or light incident surface 712 on which externally applied light is incident. The light applied onto the light incident surface 712 travels in the body 710 and exits mainly through the first and second surfaces 714, 716 which may be or not be parallel with each other. The light has various traveling paths in the body 710, each of which ends up with exiting through the first or second surface 714, 716 upon satisfying the conditions of the Snell's law of light refraction. The light exiting through the first or second surface 714, 716 may have various angles with respect to corresponding one of the first and second surfaces 714, 716. For example, the light exits the light guide plate 700 at an emission angle $\theta_1$ with respect to the first or second surface 714, 716. The light emission angle $\theta_1$ is one of the factors determining efficiency of the light guided by the light guide plate 700.

Through experiments including computer simulation, it has been proved that luminance at a display apparatus employing the light guide plate 700 increases as the light exiting through the first or second surface becomes perpendicular to the corresponding surface (i.e., the light emission angle $\theta_1$ becomes close to about 90°). On the contrary, luminance at the display apparatus decreases as the exiting light becomes parallel to the corresponding surface (i.e., the light emission angle $\theta_1$ becomes close to about 0°).

The light guide plate 700 also has a light reflection pattern 720 for adjusting the light paths in the body 710 and the light emission angle. In other words, the light reflection pattern 720 is designed to reflect the light from the light incident surface 712, and the reflected light exits the second surface 716 at an emission angle larger than the emission angle $\theta_1$. Assuming that a light guide plate has no such light reflection pattern 720 and a display panel is disposed over the second surface 716, there is inevitable loss of light exiting the first surface which has no use for the display. In the present invention, since the light guide plate 700 has the light reflection pattern 720 with functions of reflecting the light as well as adjusting the light paths, light efficiency of a display apparatus employing the light guide plate 700 advantageously increases.

In this embodiment, as shown in FIG. 1, the light reflection pattern 720 has a shape of prism dots 721 formed on the first surface 714. It should be noted that a display panel (not shown) is assumed to be disposed at the side of the second surface 716. In like manner, assuming that a display panel is disposed at the side of the first surface 714, the light reflection pattern 720 would be formed on the second surface 716.

The light provided through the light incident surface 712 is reflected by the light reflection pattern 720, and the reflected light exiting through the second surface 716 has a light emission angle $\theta_2$ with respect to the second surface 716. For convenience of the description, the emission angle $\theta_1$ of the light reflected by the first surface 714 and exiting through the second surface 716 is referred to as a "first light emission angle $\theta_1$," and the emission angle $\theta_2$ of the light reflected by the light reflection pattern 720 and exiting through the second surface 716 is referred to as a "second light emission angle $\theta_2$." Each prism dot 721 of the light reflection pattern 720 has light reflecting surfaces forming one or more prisms on the surface of each dot. Such prisms of the light reflection pattern 720 are designed to reflect the light such that the second light emission angle $\theta_2$ is larger than the first light emission angle $\theta_1$. In other words, the second light emission angle $\theta_2$ is adjusted by the light reflection pattern 720 to maximize the efficiency of the light exiting the second surface 716. A detailed description of the light reflection pattern 720 follows below.

Figure 2A:
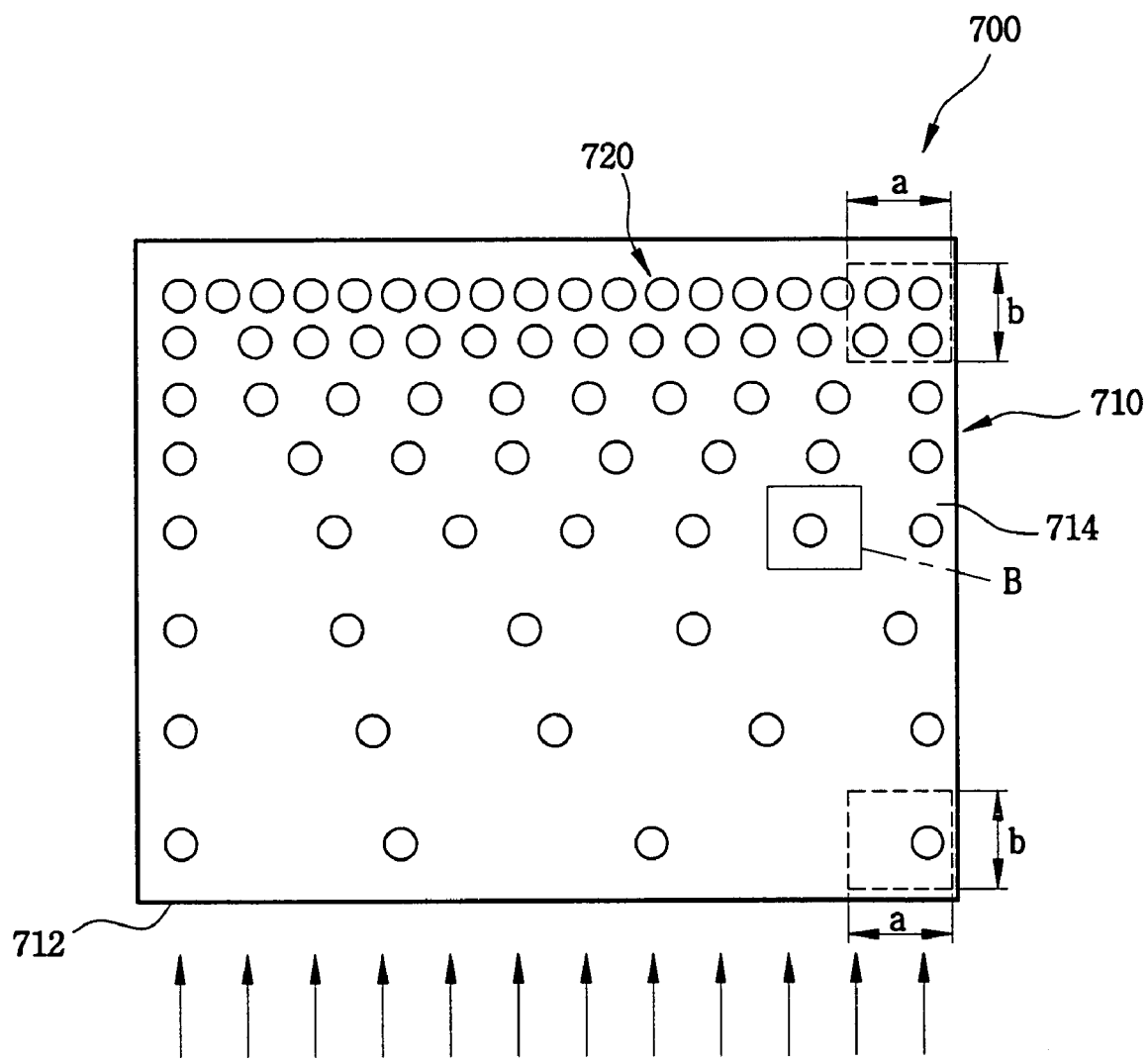
FIGS. 2A and 2B are schematic diagrams each illustrating a light reflection pattern of the light guide plate according to an embodiment of the present invention.

FIG. 2A is a schematic diagram illustrating a light reflection pattern according to an exemplary embodiment of the present invention. The light reflection pattern 720 is formed on the first surface 714 of the light guide plate 700 and has multiple prism dots 721 each having a plate shape with a selected thickness. The prism dots 721 may also have various shapes such as circular, rectangular or polygonal shapes. In this embodiment, for example, the prism dots 721 have a circular shape.

In this embodiment, the prism dots 721 have a substantially identical size and are formed on the first surface 714 with different densities at different areas thereon. Here, the term "density" is defined as the size of accumulated area of prism dots formed at a unit area (a×b in FIG. 2A). Thus, the more the number of the prism dots at a unit area, the larger the density of the prism dots at the unit area.

In the embodiment of FIG. 2A, the number of the prism dots 721 per unit area varies depending on the position of a measured area. The number of the prism dots 721 per unit area increases inversely proportional to the amount of light arriving on the measured area. In other words, the light reflection pattern 720 has less prism dots 721 per unit area (i.e., a smaller density) at an area closer to the light incident surface 712, and more prism dots 721 per unit area (i.e., a larger density) at an area more distant from the light incident surface 712. In FIG. 2, for example, there a single prism dot 721 at the unit area (a×b) proximate to the light incident surface 712, and there are four or more prism dots 721 at the same unit area (a×b) far distant from the light incident surface 712. Also, the number of the prism dots 721 vary gradually depending on the position of an area on which light arrives from the light incident surface 712, so that the light exiting the second surface 716 has uniform luminance.

Figure 2B:
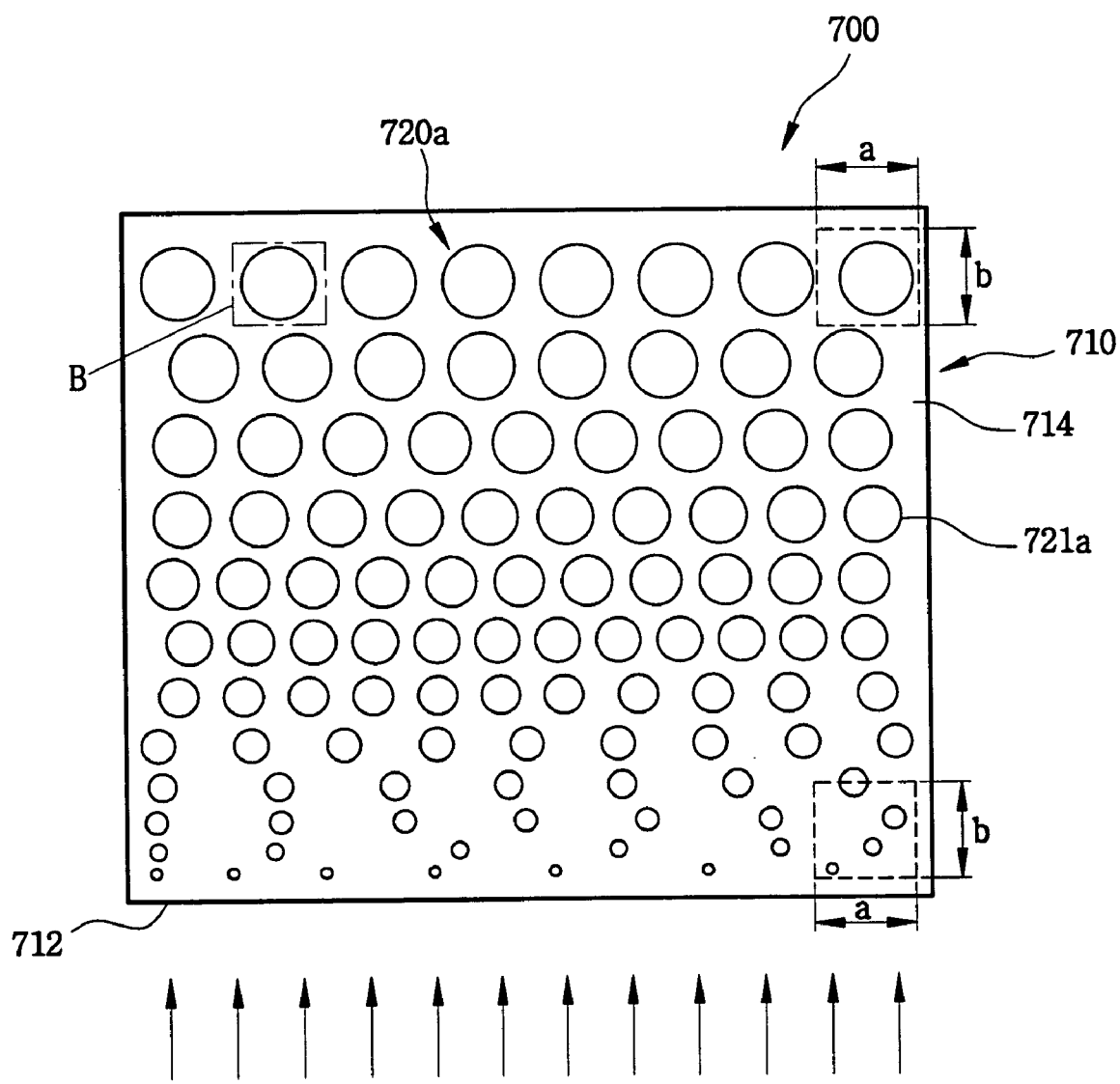

Referring to FIG. 2B, the prism dots 721a formed on the light reflection pattern 720a have different sizes depending on the position of an area at the first surface 714. The sizes of the prism dots are different such that the larger the density of a unit area, the farther the unit area from the light incident surface 712, and in like manner, the smaller the density of a unit area, the closer the unit area to the light incident surface 712. In this embodiment, since the density of prism dots is controlled by forming the prism dots in different sizes, an area farther from the light incident surface 712 has larger prism dots and an area closer to the light incident surface 712 has smaller prism dots.

Accordingly, in the light reflection patterns 720, 720a of FIGS. 2A and 2B, the density of prism dots at a unit area varies in association with the amount of light arriving at the unit area. An area receiving more amount of light has a smaller density of the prism dots, and an area receiving less amount of light has a larger density of the prism dots.

Figure 3:
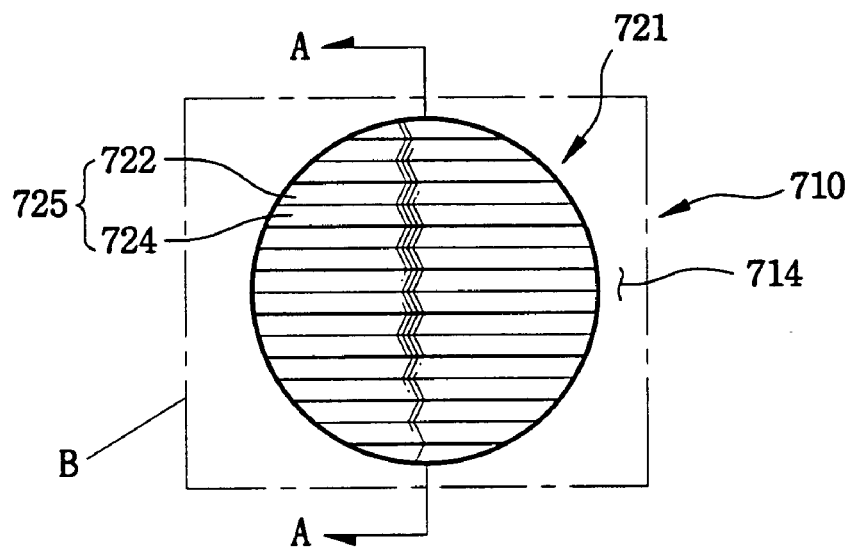
FIG. 3 is an enlarged view of portion B in FIGS. 2A and 2B.
Figure 4:
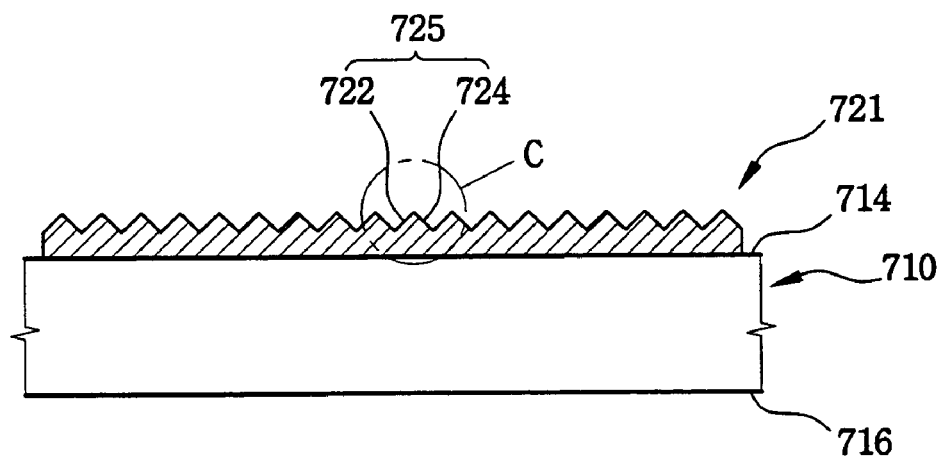
FIG. 4 is a cross-sectional view of a prism dot in FIG. 3.

FIG. 3 is an enlarged view of portion B in FIGS. 2A and 2B. FIG. 4 is a cross-sectional view of the prism dot taken along line A-A' in FIG. 3. Referring to FIGS. 1 through 4 together, a detailed description of a prism dot of the light reflection pattern follows. The prism dot 721 has one or more light reflecting surfaces 725 to reflect light from the light incident surface 712 to the second surface 716. The light reflected by the light reflecting surfaces 725 and exiting through the second surface 716 has the second light emission angle $\theta_2$ larger than the first light emission angle $\theta_1$ of the light reflected by the first surface 714 (not prism dots 721) and exiting through the second surface 716.

Figure 5:
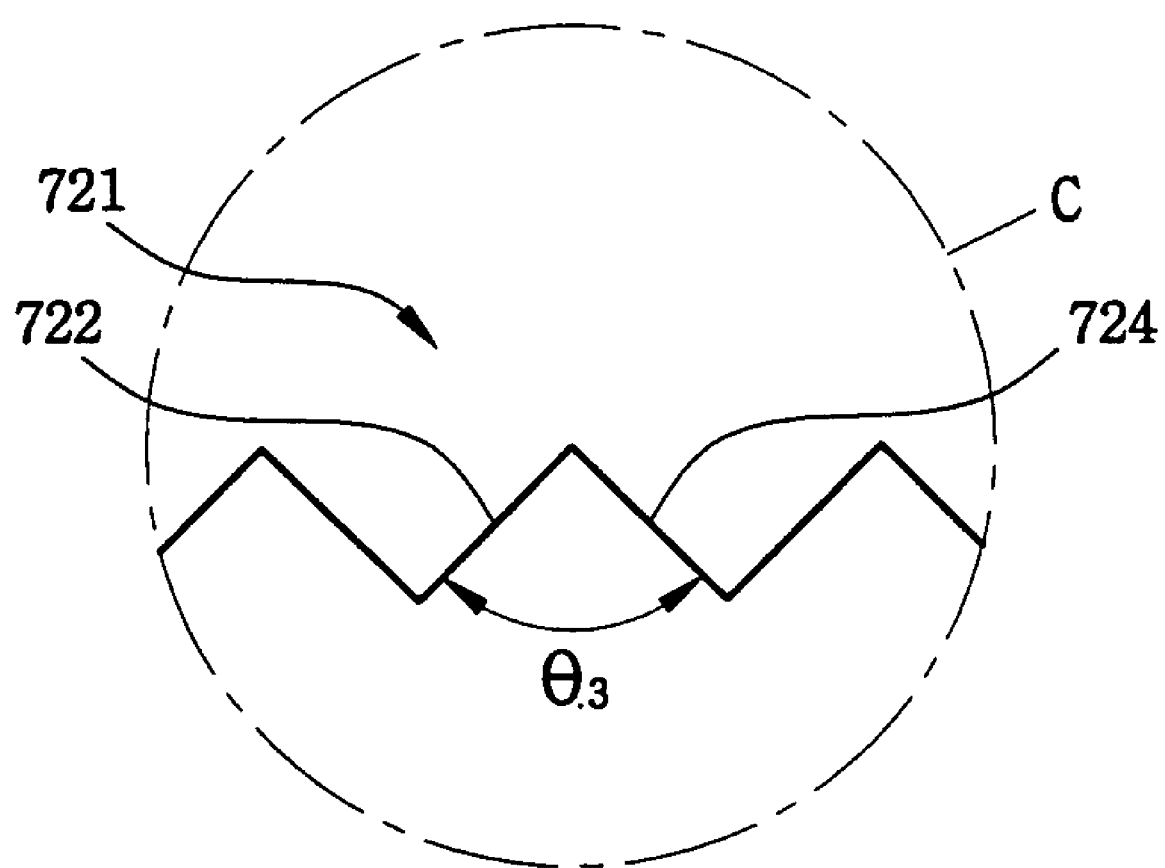
FIG. 5 is an enlarged view of portion C in FIG. 4.

The light reflecting surfaces 725 form sawtooth-shaped prisms each of which has first and second light reflecting surfaces 722, 724, as shown in FIG. 5, an enlarged view of portion C in FIG. 4. The first and second light reflecting surfaces 722, 724 meet each other to have an angle $\theta_3$ therebetween. Where the angel $\theta_3$ between the first and second light reflecting surfaces 722, 724 is in the range from about 80° to about 120°, the second light emission angle $\theta_2$ is larger than the first light emission angle $\theta_1$. In particular, when the angle $\theta_3$ is from about 82° to about 84° (more particularly, about 82.5°), the second light emission angle $\theta_2$ becomes about 90° so that the luminance at a display panel becomes maximized. Also, the light reflecting surfaces 725 are formed having a regular pattern such that the sawtooth-shaped prisms have a substantially identical pitch (i.e., a distance between the adjacent prisms) in a range, for example, from about 20 μm to about 200 μm. Accordingly, the light guide plate 700 with the light reflection pattern 720 according to the present invention provides a display panel with the light substantially perpendicular to the surface of the light guide plate 700 so that light efficiency and luminance at the display panel increase without additional diffusion and/or prism sheets.

Generally, prism sheets and diffusion sheets in a light guide plate are used to adjust the paths of light exiting the light guide plate for the purpose of enhancing the light efficiency and luminance at a display panel. In the present invention, since the light exiting the second surface 716 of the light guide plate 700 is adjusted by the light reflection pattern 720 to have the light emission angle $\theta_2$ equal to about 90°, the prism and/or diffusion sheets are no longer necessary for increasing the luminance and/or light efficiency at a display panel receiving light from the light guide plate 700.

Figure 6:
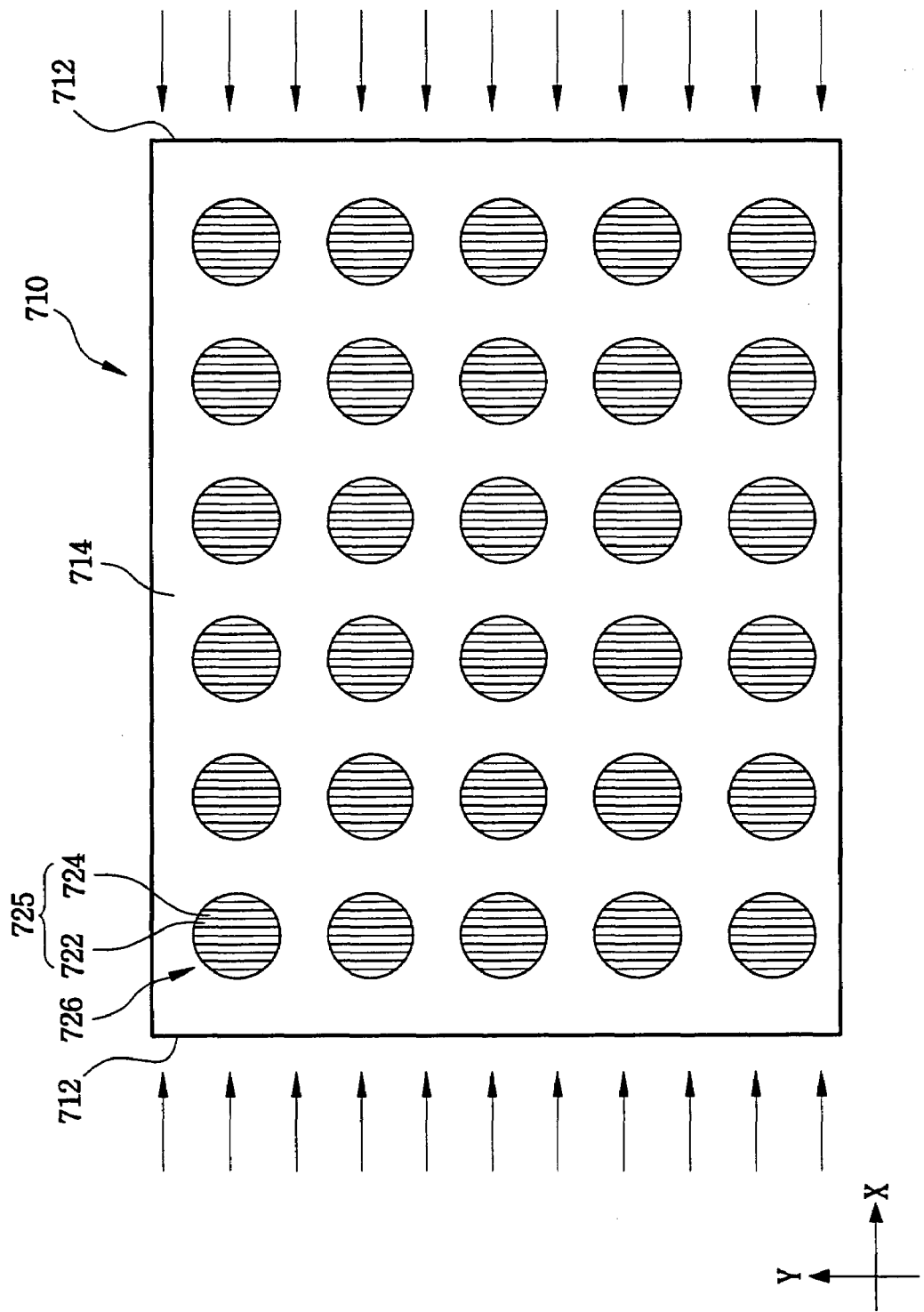
FIG. 6 is a schematic diagram illustrating a light reflection pattern according to an embodiment of the present invention.

FIG. 6 is a schematic diagram illustrating a light reflection pattern according to an exemplary embodiment of the present invention. In the light reflection pattern 726, the alignment direction of the light reflecting surfaces 725 and the incident direction of the light incident onto the light incident surface 712 are factors of determining luminance at a display panel. The luminance increases in case that the light is incident on the light incident surface 712 in X-direction and the light reflecting surfaces 725 are elongated and aligned in Y-direction. In other words, when the light reflection pattern 726 has prism dots with the light reflecting surfaces 725 aligned in a direction substantially perpendicular to a direction of the light provided to the light incident surface 712, the luminance increases at a display panel receiving the light from the light guide plate 700 with the light reflection pattern 726.

Figure 7:
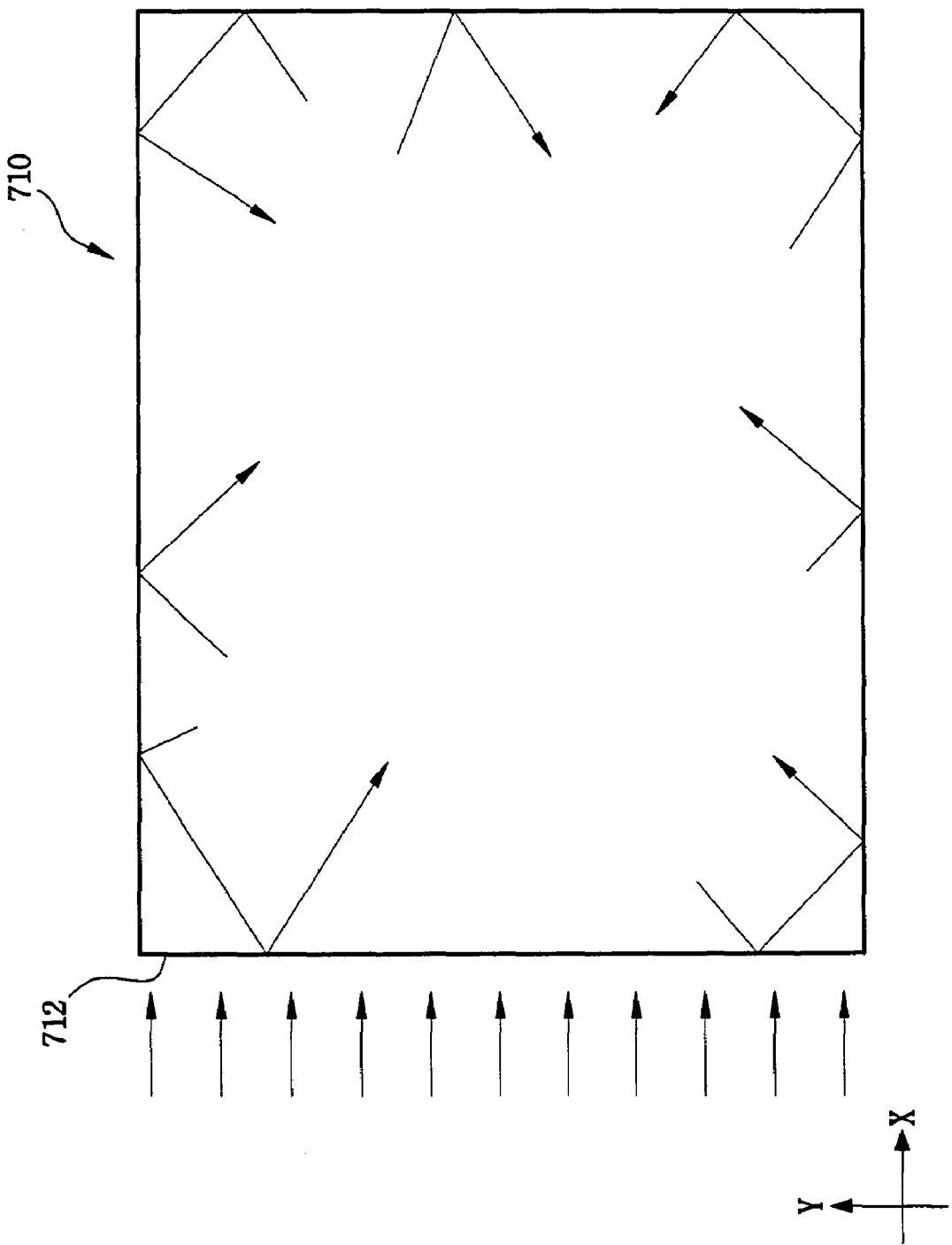
FIG. 7 is a schematic diagram illustrating paths of light traveling in a light guide plate body.

FIG. 7 is a schematic diagram illustrating paths of light traveling in the light guide plate body 710. The light incident on the light incident surface 712 reflects from the first and second surfaces 714, 716 and the multiple side surfaces including the light incident surface 712 so that the light has various traveling paths in the body 710. Of the various light paths, some of them do not arrive on a prism dot so that there would be light not reflected by the prism dots to the second surface 716. Such light not reflected by the prism dots results in a loss of the light, which causes a decrease in the luminance at a display panel. Such loss of light may be prevented by employing the light guide plate having the light reflection pattern 726 with light reflecting surfaces 725 aligned in a direction parallel with the light incident surface 712.

Figure 8:
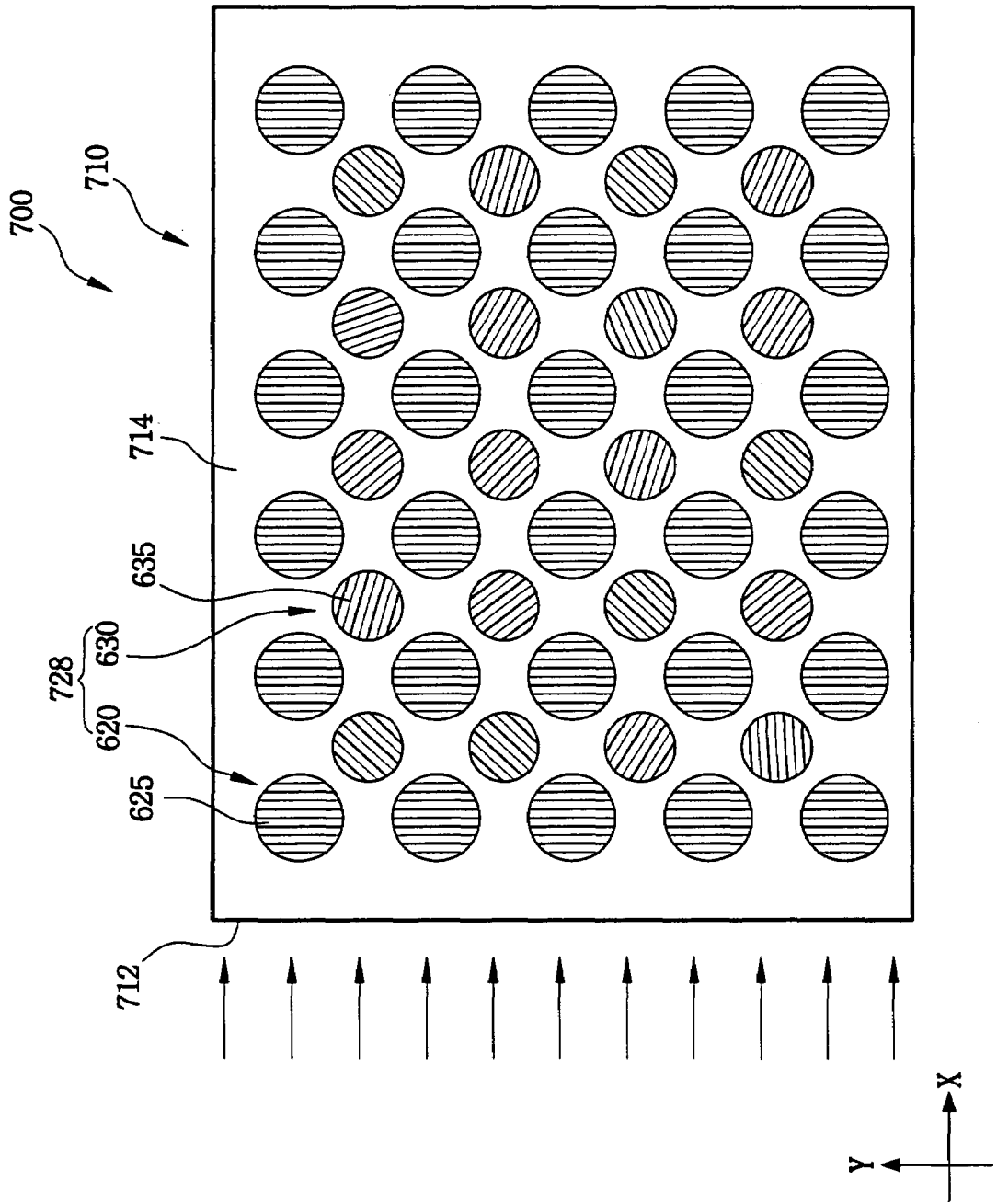
FIG. 8 is a schematic diagram illustrating a light reflection pattern according to another embodiment of the present invention.

FIG. 8 is a schematic diagram illustrating a light reflection pattern according to another embodiment of the present invention. The light reflection pattern 728 basically has two types of patterns, a first light reflection pattern 620 and a second light reflection pattern 630. The first light reflection pattern 620 includes prism dots each having light reflecting surfaces 625 elongated and aligned parallel to the light incident surface 712. The first light reflection pattern 620 reflects the light provided through the light incident surface 712 toward the second surface 716 at the second light emission angle $\theta_2$ (referring to FIG. 1).

The second light reflection pattern 630 includes prism dots each having light reflecting surfaces 635 elongated and aligned nonparallel to the light incident surface 712. The second light reflection pattern 630 reflects toward the second surface the light that is not reflected by the first light reflection pattern 620. The light reflecting surfaces 635 of the second light reflection pattern 630 may be aligned regularly in a selected direction or irregularly in various directions.

Thus, for example, the first and second light reflection patterns 620, 630 are aligned such that the light reflecting surfaces 625 of the first light reflection pattern 620 are aligned parallel to the light incident surface 712, and the light reflecting surfaces 635 of the second light reflection pattern 630 are aligned randomly independent of the direction of the light incident surface 712. Also, the prism dots of the first light reflection pattern 620 are uniformly arranged in a matrix form, and the prism dots of the second light reflection pattern 630 are arranged such that a prism dot of the second light reflection pattern 630 is disposed between adjacent prism dots of the first light reflection pattern 620. As a result, such light reflection patterns 620, 630 may generate the same effects as if multiple prism sheets were employed in addition to a light guide plate.

Figure 9:
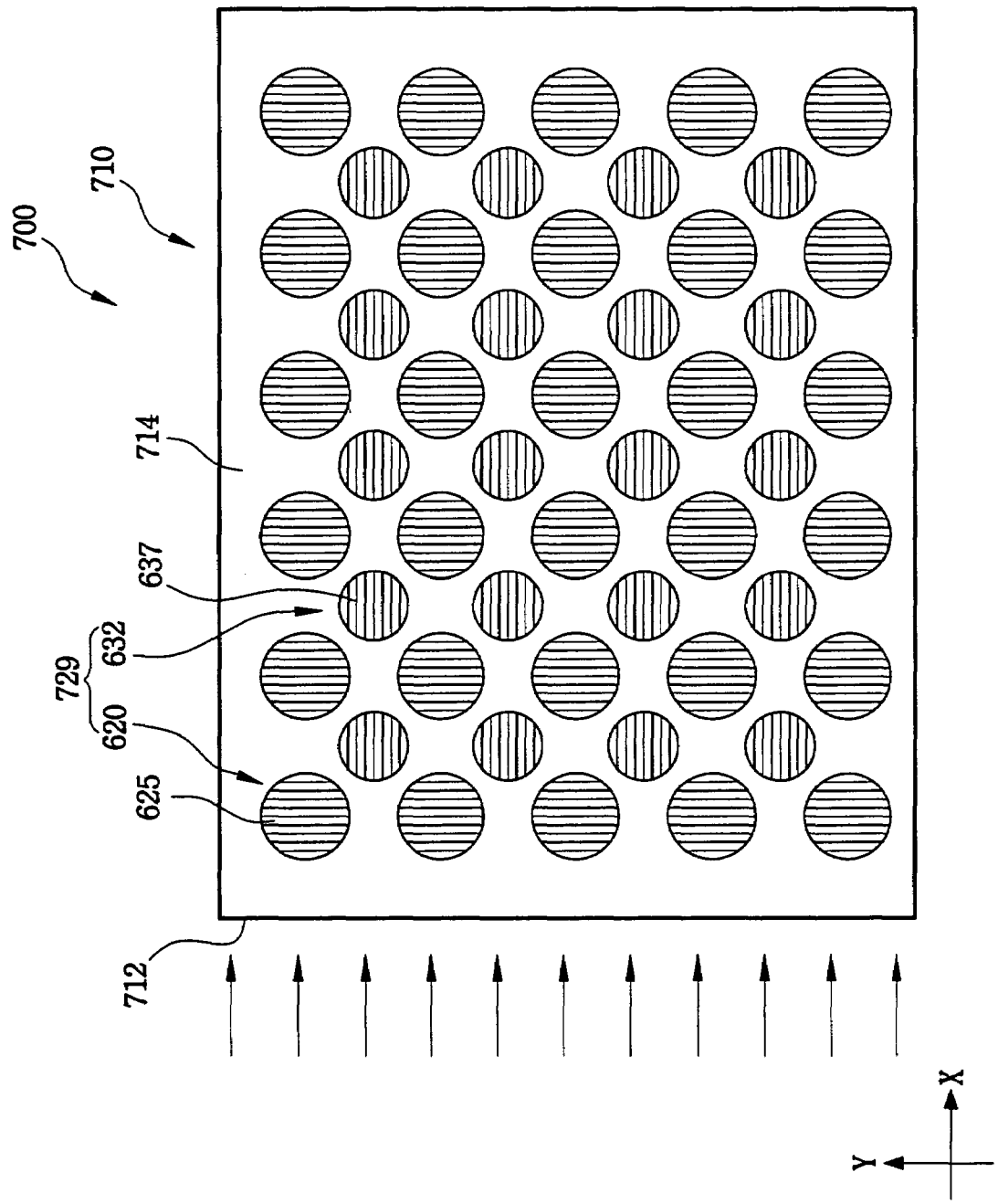
FIG. 9 is a schematic diagram illustrating a light reflection pattern according to another embodiment of the present invention.

FIG. 9 is a schematic diagram illustrating a light reflection pattern according to another embodiment of the present invention. The light reflection pattern 729 also has two types of patterns including the first light reflection pattern 620 and a third light reflection pattern 632. The first light reflection pattern 620 is the same as in the embodiment of FIG. 8. That is, the first light reflection pattern 620 has the light reflecting surfaces 625 aligned parallel to the light incident surface 712. The third light reflection pattern 632 of this embodiment includes prism dots having light reflecting surfaces 637 elongated and aligned substantially perpendicular to the light incident surface 712. In other words, the light reflecting surfaces 637 of the third light reflection pattern 632 are aligned in X-direction while the light reflecting surfaces 625 of the first light reflection pattern 620 are aligned in Y-direction. Thus, the alignment directions of the light reflecting surfaces 625, 637 of the first and third light reflection patterns 620, 632 are substantially perpendicular to each other. This provides similar effects as if employing two prism sheets arranged such that prisms of the respective prism sheets are perpendicular to each other.

In this embodiment, the prism dots of the first light reflection pattern 620 are arranged in a matrix form, and the prism dots of the third light reflection pattern 632 are each interposed between adjacent prism dots of the first light reflection pattern 620. The prism dots of the first and third light reflection patterns 620, 632 may have a substantially identical size or different sizes. For example, the prism dots of the third light reflection pattern 632 are smaller than those of the first light reflection pattern 620, as shown in FIG. 9.

Figure 10:
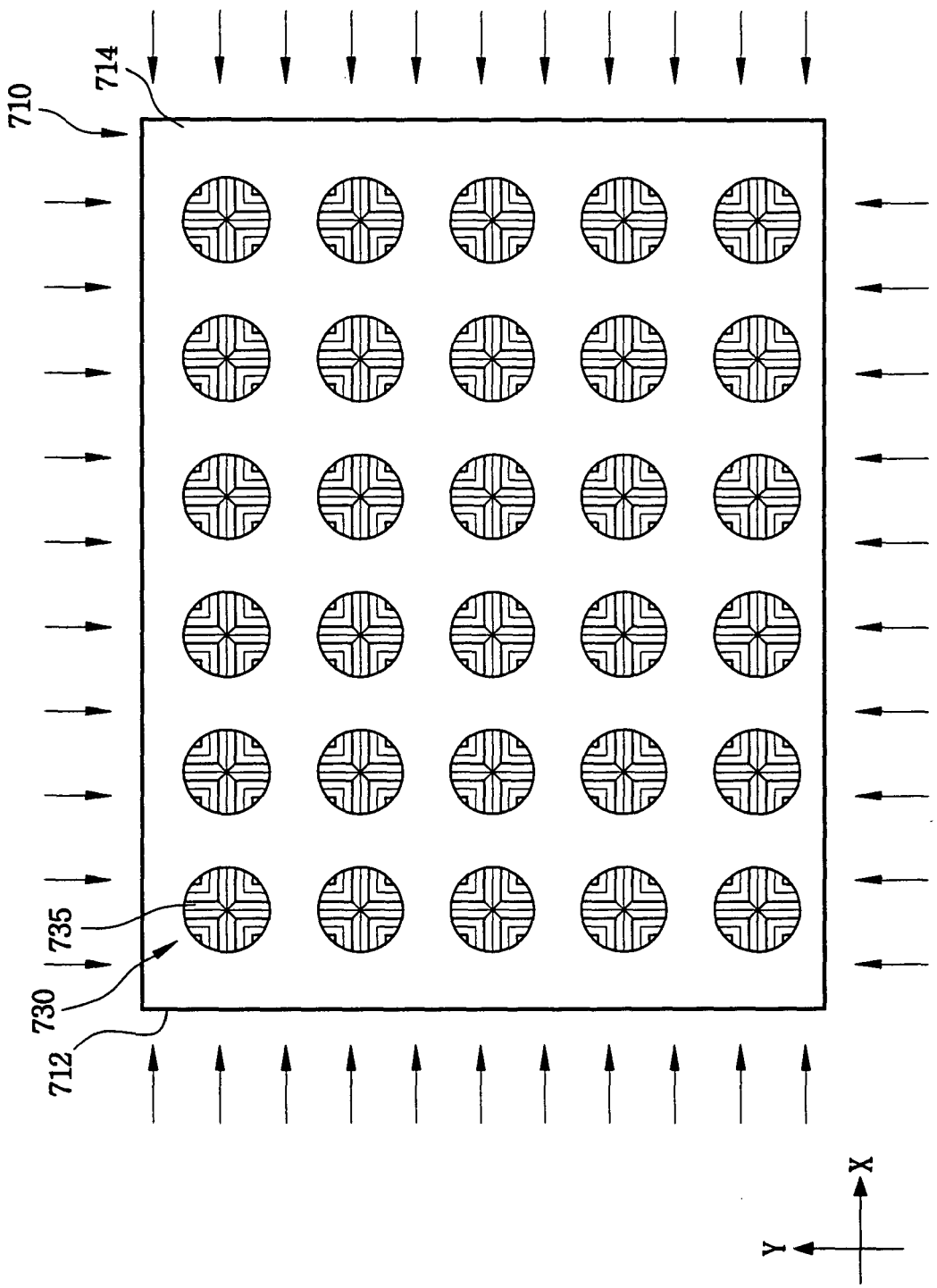
FIG. 10 is a schematic diagram illustrating a light reflection pattern according to another embodiment of the present invention.

FIG. 10 is a schematic diagram illustrating a light reflection pattern according to another embodiment of the present invention. The light reflection pattern 730 of this embodiment includes prism dots each having light reflecting surfaces 735 elongated and aligned in various directions. The light reflecting surfaces 735, for example, each have at least one bent portion. In particular, the prism dots of the light reflection pattern 730 each have a cross-shaped pattern such that the light reflecting surfaces 735 are each bent to have an L-shape and the L-shaped light reflecting surfaces 735 are continuously disposed in each quadrant of the prism dots. It should be noted that the prism dots in FIG. 10 have the L-shaped light reflecting surfaces 735 as an exemplary embodiment, and that the prism dots may have different shapes of light reflecting surfaces such as zigzag-shaped surfaces or combination thereof.

In this embodiment, it is advantageous that the prism dots may be arranged independent of directional relationship between the light reflecting surfaces and the light incident surfaces. When light is provided to the four side surfaces of the body 710, the light reflection pattern 730 with the bent light reflecting surfaces 735 effectively reflects the light toward a display panel. In other words, the light reflected by the light reflection pattern 730 exits the light guide plate toward a display panel at an increased light emission guide angle proximate about 90°. This is because each dot of the light reflection pattern 730 has the light reflecting surfaces 735 aligned in directions each perpendicular to corresponding one of the light incident directions.

Figure 11A:
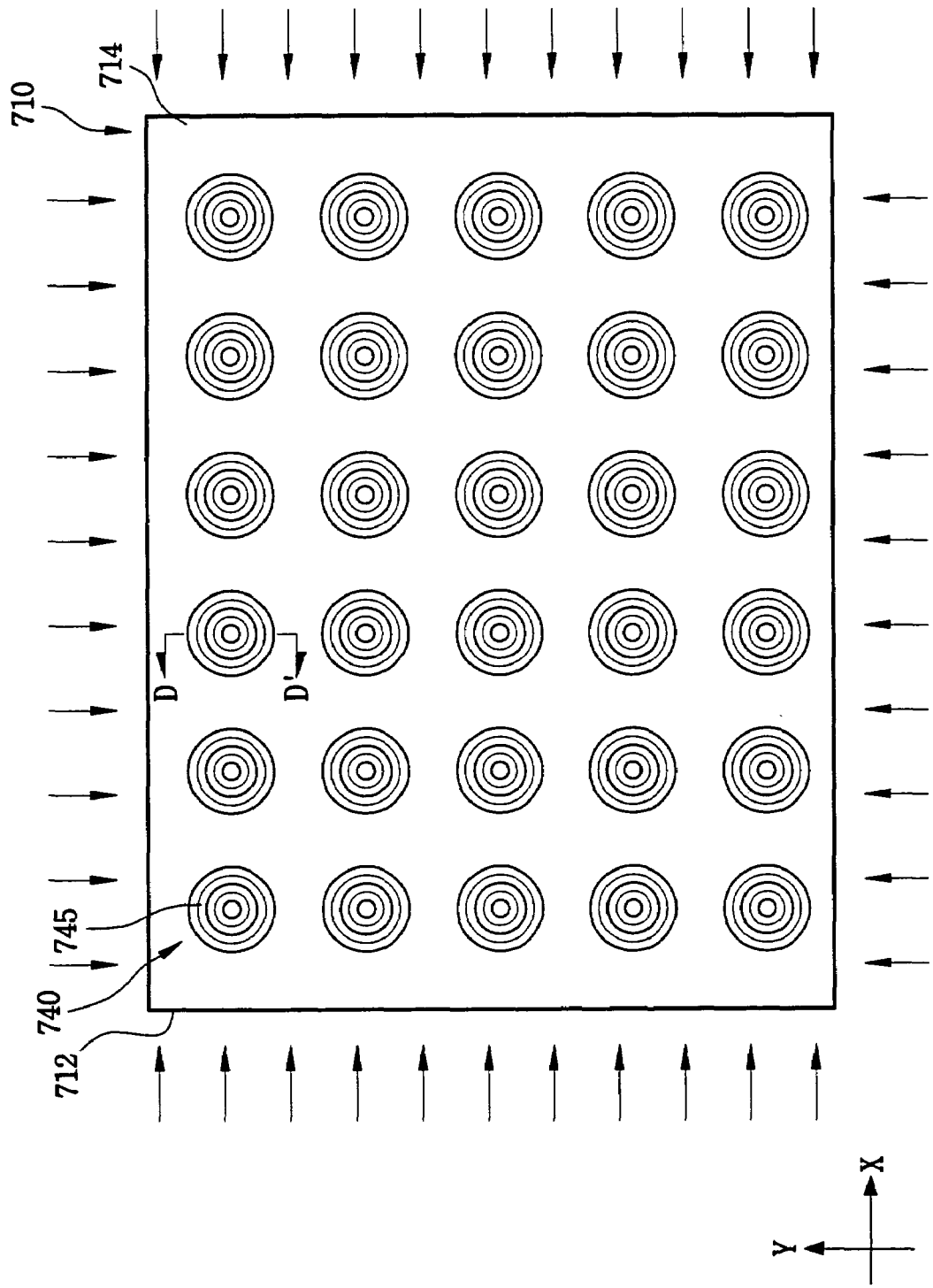
FIG. 11A is a schematic diagram illustrating a light reflection pattern according to another embodiment of the present invention.

FIG. 11A is a schematic diagram illustrating a light reflection pattern according to another embodiment of the present invention. The light reflection pattern 740 of this embodiment includes prism dots having light reflecting surfaces 745 with a concentric circular shape. For example, each prism dot has multiple light reflecting surfaces 745 which are concentric circles, as shown in FIG. 11A. Since the light reflecting surfaces 745 have a circular shape (i.e., a continuously bent shape), they reflect the light with uniform distribution independent of directions of the light provided from the light incident surfaces 712. Thus, the light reflection pattern 740 increases the light efficiency and luminance at a display panel.

Figure 11B:
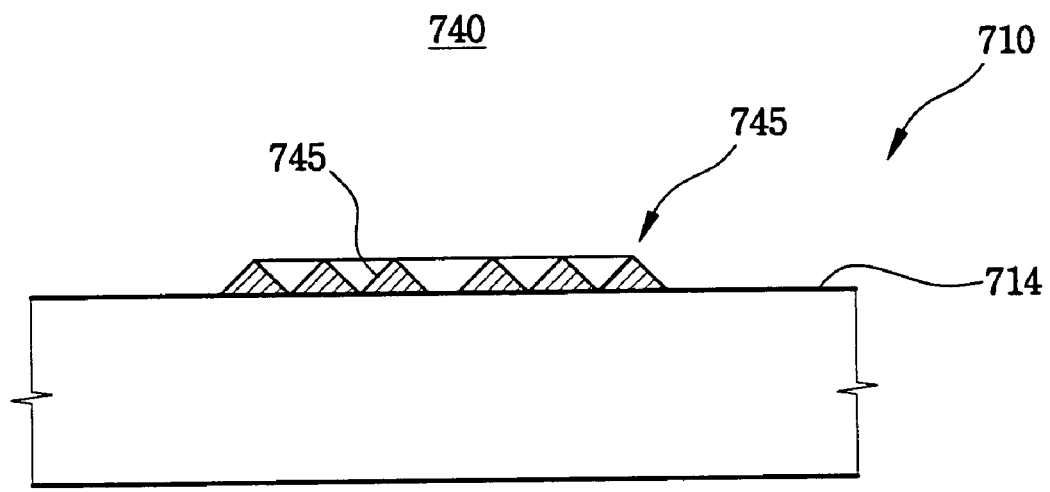
FIG. 11B is a cross-sectional view of a prism dot in FIG. 11A.
Figure 11C:
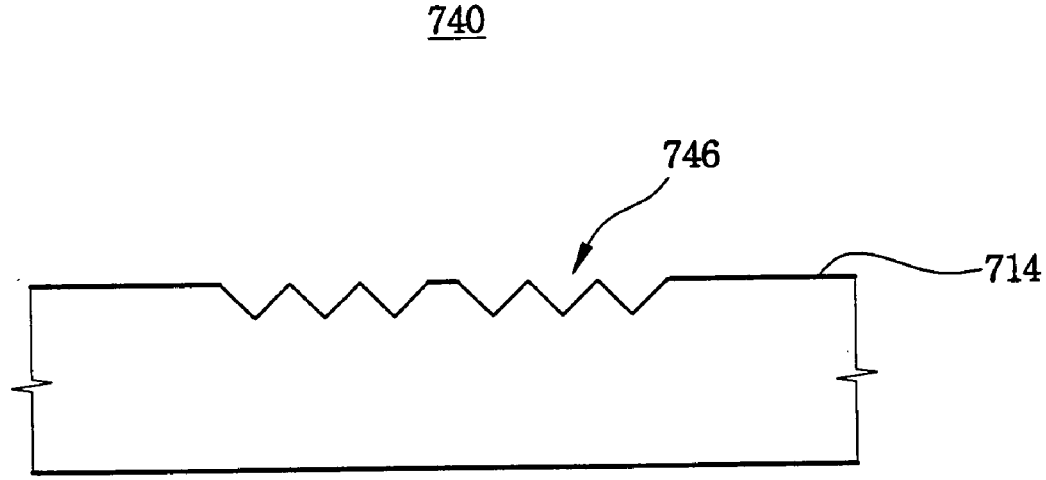
FIG. 11C is a cross-sectional view of a prism dot according to another embodiment of the present invention.

FIG. 11B is a cross-sectional view of the prism dot taken along line D-D' in FIG. 11A. In this embodiment, the prism dots each have the light reflecting surfaces formed on the first surface 714 in a convex shape. Also, the prism dots may each have light reflecting surfaces 746 formed on the first surface 714 in a concave shape, as shown in FIG. 11C.

The above-mentioned light reflection patterns are integrally formed on the first surface 714. The prism dots with the light reflecting surfaces are integrally connected with the body of the light guide plate. The method of forming the light reflection patterns will be described in detail below. In contrast, a light reflection pattern may be formed as a separate layer, and the separate light reflection pattern is attached on a surface of the light guide plate.

Figure 12:
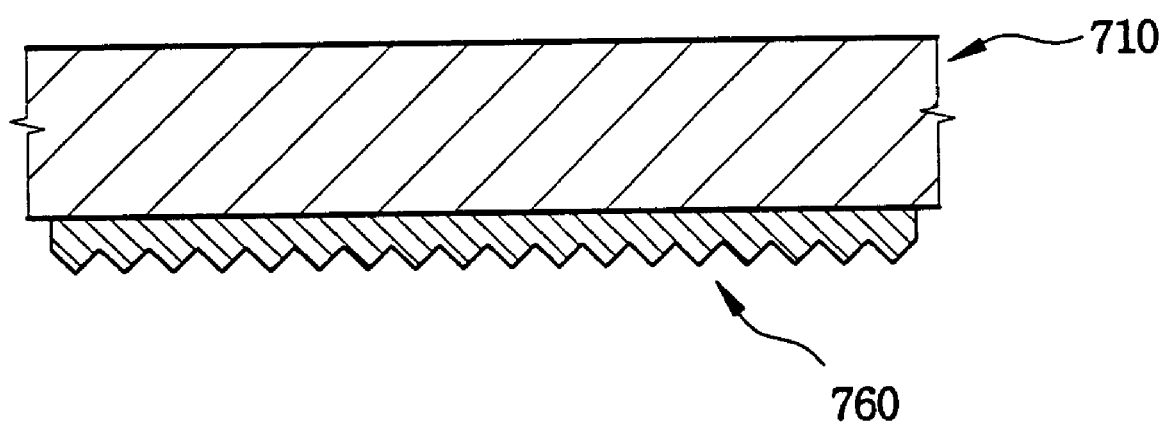
FIG. 12 is a schematic diagram illustrating a light reflection pattern according to another embodiment of the present invention.

FIG. 12 is a schematic diagram illustrating a light reflection pattern attached on the light guide plate according to an exemplary embodiment of the present invention. The light reflection pattern 760 is separately formed to have one of the shapes described above in FIGS. 1 through 11C. In other words, the light reflection pattern 760 has prism dots with light reflecting surfaces that have a shape same as one of the embodiments described above. The separate light reflection pattern 760 is attached onto the first surface of the light guide plate body 710 using, for example, adhesive.

The light reflection pattern 760 has a refractive index substantially identical to that of the light guide plate body 710. For example, the light reflection pattern 760 and the body 710 may have same refractive index "1.4".

In the above exemplary embodiments, various structural configuration of the light guide plate according to the present invention is described. A detailed description of fabricating the light guide plate of the present invention follows.

To fabricate the light guide plate, a body for the light guide plate needs to be prepared first. The body is formed to have surfaces such as first and second surfaces facing each other and at least one side surface onto which light is incident. The first and second surfaces are connected with the at least one side surface to form the there-dimensional body. The body with such configuration may be made of synthetic resin by using a mold. On one of the first and second surfaces, the light reflection pattern is formed, for example, as shown in FIGS. 1 through 12.

Figure 13A:
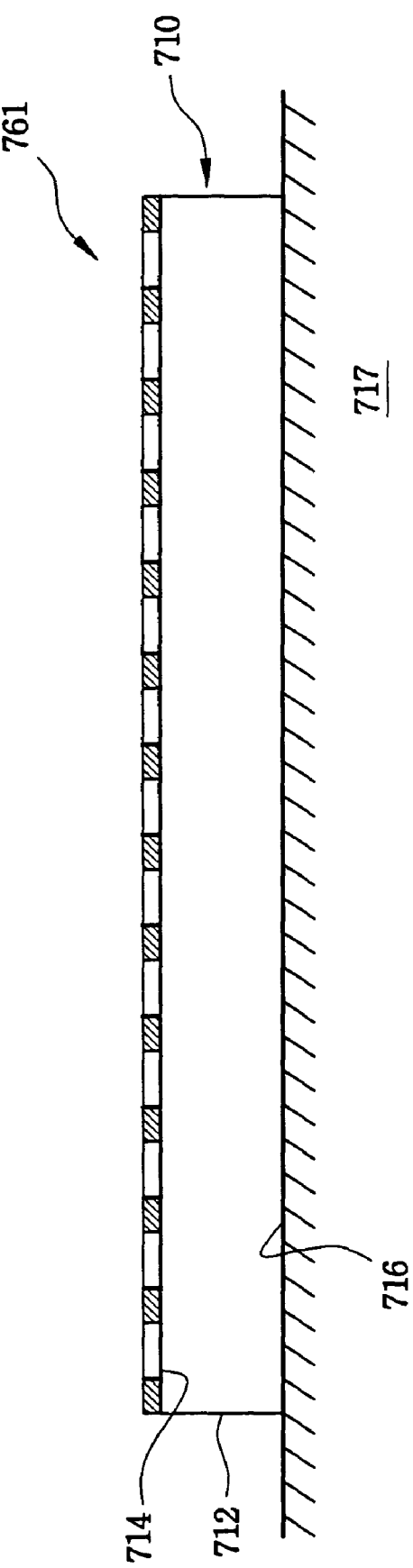
FIG. 13A is a schematic diagram illustrating a light guide plate body and a pattern mask placed thereon.

FIG. 13A is a schematic diagram illustrating a light guide plate body 710 on which a pattern mask 761 is placed. The pattern mask 761 has a specific pattern for forming the light reflection pattern on a surface of the body 710. In this embodiment, since the light reflection pattern is formed on the first surface 714, the body 710 is placed on a base 717 for the second surface 716 to face thereon. Then, the pattern mask 761 is disposed on the first surface 714.

Figure 13B:
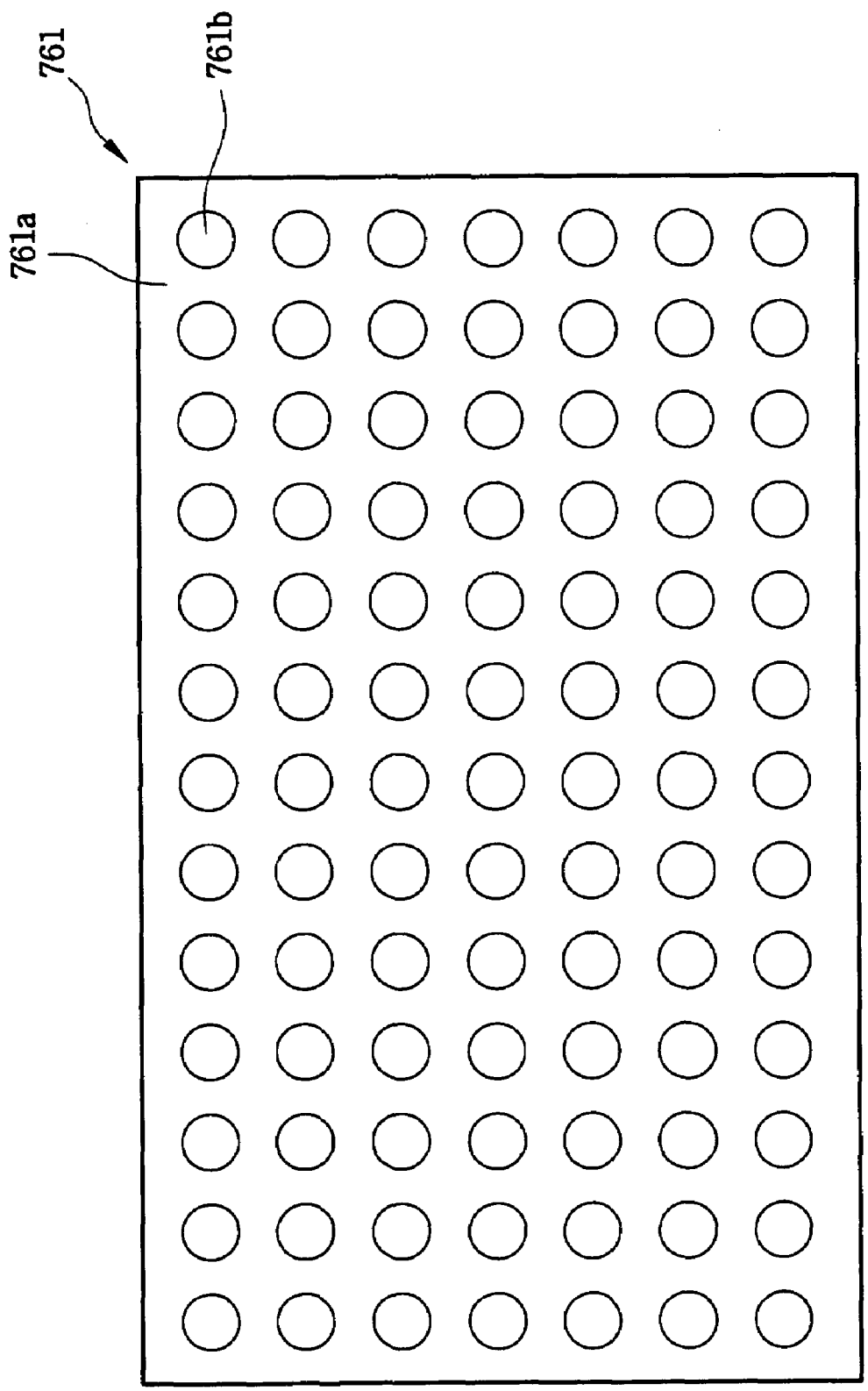
FIG. 13B is a top view of the pattern mask in FIG. 13A.

FIG. 13B is a top view of the pattern mask 761 in FIG. 13A. The pattern mask 761 has a mask body 761a and multiple openings 761b formed in the mask body 761a. The mask body 761a has a size and a shape corresponding to those of the light reflection pattern, and the openings 761b each have a size, a shape and a position corresponding to those of the dots of the light reflection pattern. For example, the openings 761b may have a same size or different sizes varying in consideration of the light incident onto the light guide plate.

Figure 13C:
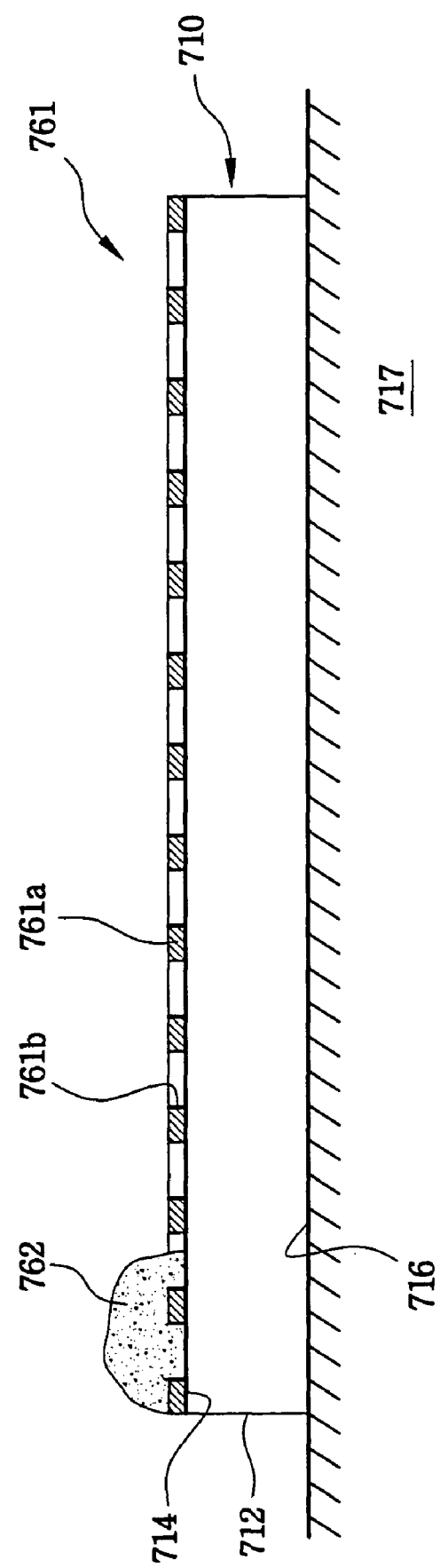
FIG. 13C shows a process of disposing material on the pattern mask.

Upon placing the pattern mask 761 on the first surface 714 of the body 710, a material 762 for the light reflection pattern is disposed on the pattern mask 761 as shown in FIG. 13C. The material 762 for the light reflection pattern is, for example, UV (ultraviolet) curable material which is cured by being subjected to UV beam. The UV curable material 762 may also have properties of liquidity and adhesive.

Figure 13D:
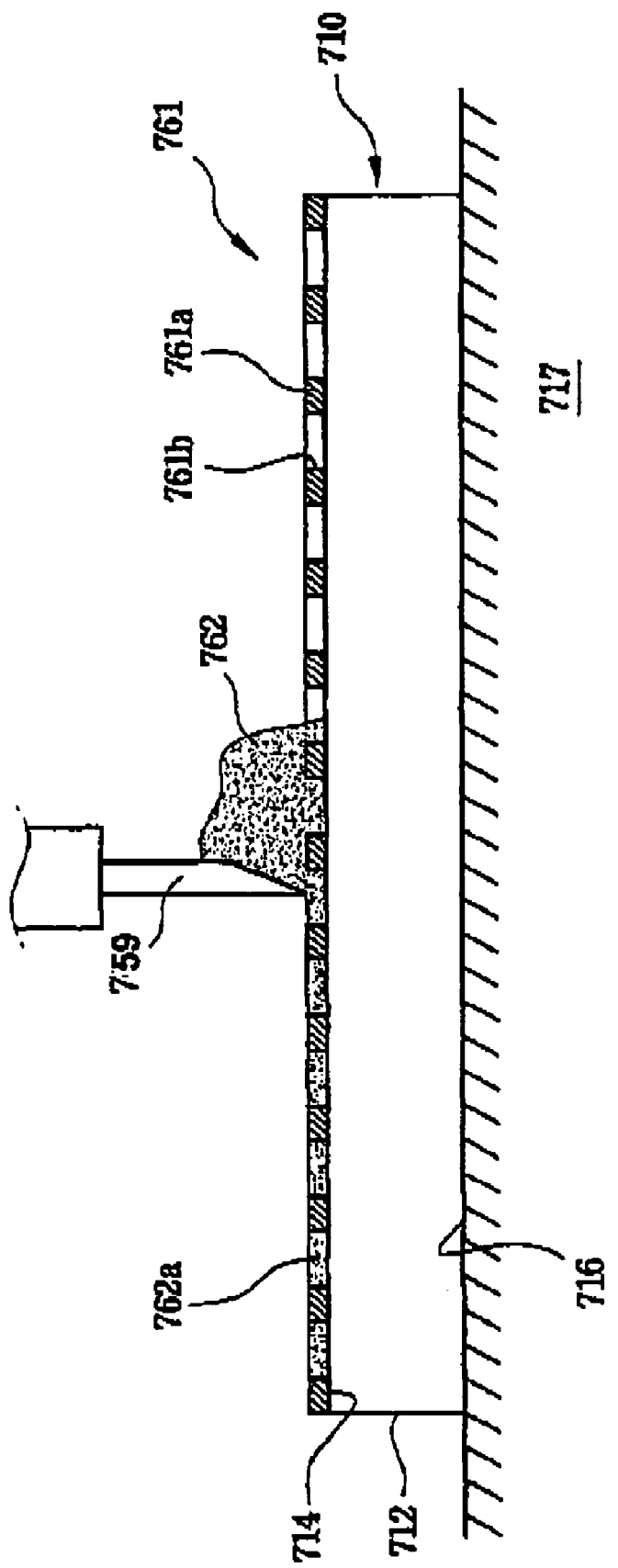
FIG. 13D shows a process of filling openings of the pattern mask with the material.

FIG. 13D shows a process of filling the openings 761b with the UV curable material 762. A scraper 759 is used to spread the disposed UV curable material 762 to fill the openings 761b with the discretely formed UV curable material 762a. The scraper 759 moves along the top surface of the pattern mask 761 so that the UV curable material 762a filled in the openings are leveled with the top surface of the mask body 761a.

Figure 13E:
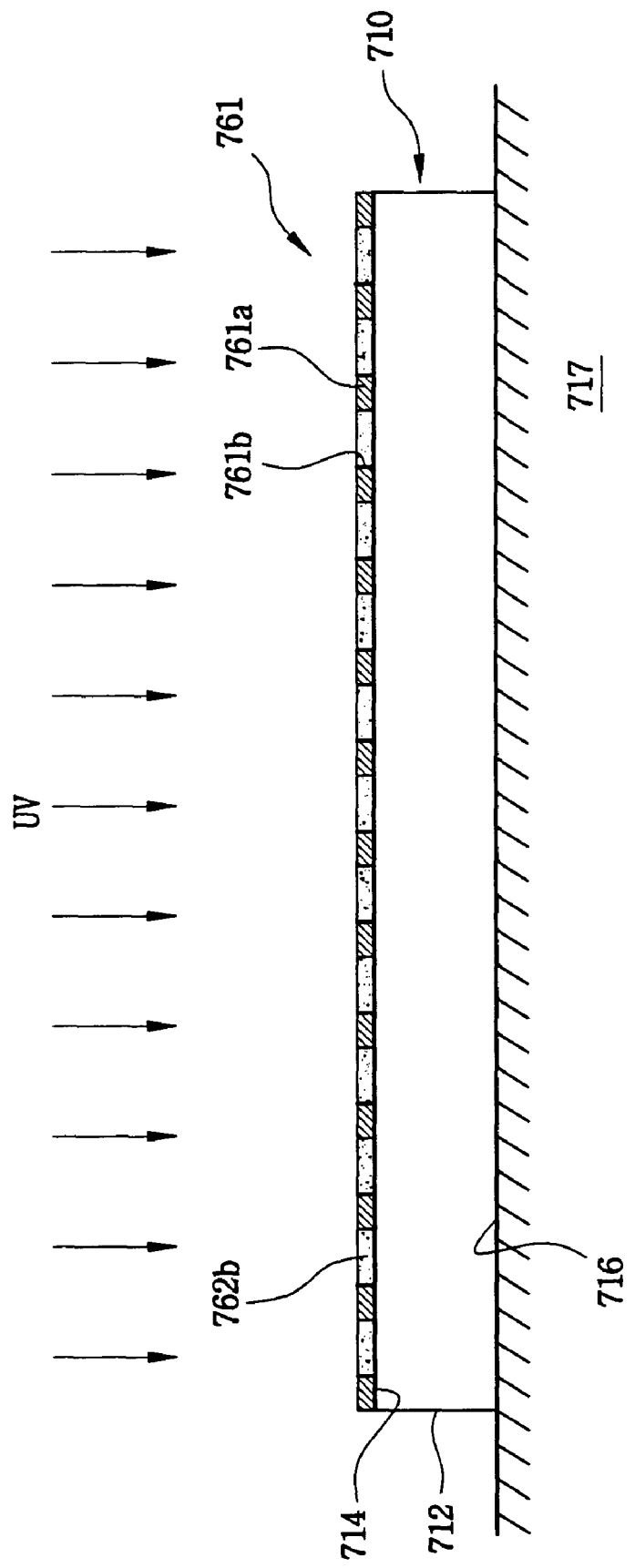
FIG. 13E shows a process of first curing the material in the openings.

Upon completing the process of filling all the openings 761b with the UV curable material 762a, UV beam is radiated over the surface of the pattern mask 761 with the UV curable material 762a as shown in FIG. 13E. The UV beam renders the UV curable material 762a cured so that the openings 761b are filled with the first cured material 762b. The UV beam is radiated over the pattern mask 761 to the extent that the first cured material 762b obtains solidity enough not to be transformed when the pattern mask is removed from the surface of the body 710.

Figure 13F:
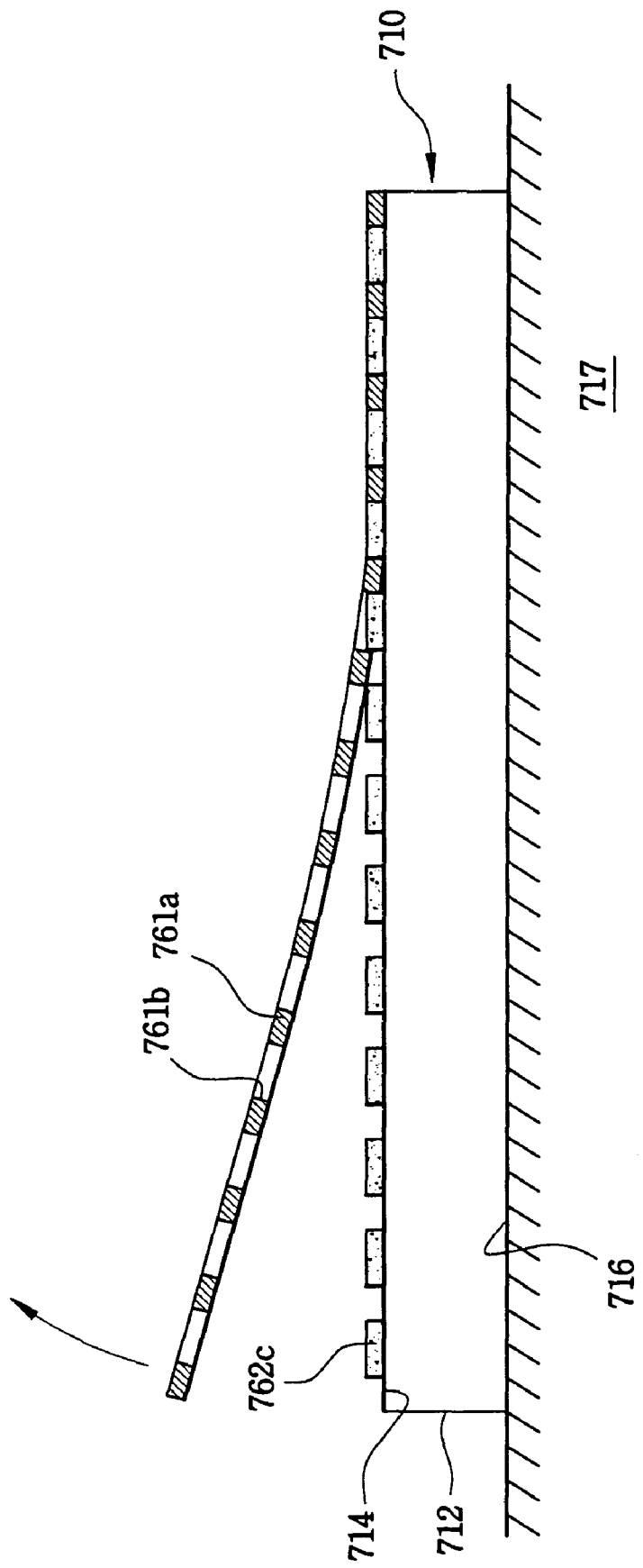
FIG. 13F shows a process of removing the pattern mask.

After forming the first cured material 762b, the pattern mask 761 is stripped from the first surface 714 of the body 710. As a result, the first cured material 762b remaining on the first surface 714 forms multiple dots 762c on the first surface 714 as shown in FIG. 13F. The first cured material dots 762c remain on the first surface 714 without any transformation due to their solidity obtained by being subjected to the first UV beam radiation.

FIG. 13G shows a process of forming a pattern on the first cured material dots 762c. In this embodiment, a pattern printer 763 is employed to print a prism pattern on the top surfaces of the respective dots 762c. The pattern printer 763 has a roller 763a with a prism pattern 763c on its surface, a rotator 763b for rotating the roller 763a, and a UV beam radiator 763d for radiating the UV beam. The prism pattern 763c formed on the surface of the roller 763a is configured to have prisms with a sawtooth-shaped cross-section.

As being rotated by the rotator 763b, the roller 763a proceeds forward along with the pattern printer 763 while pressing the top surfaces of the first cured material dots 762c with the prism pattern 763c. As a result, each of the first cured dots 762c has the same prism pattern on its top surface. The prism pattern of each dot may have multiple prisms each having side surfaces elongated and aligned in a selected direction. These side surfaces become the light reflecting surfaces of the prism dots of the light reflection pattern (referring to FIGS. 1, 3-5).

The UV beam radiator 763d moving along with the pattern printer 763 radiates the UV beam on the first cured dots with the prism pattern which still have fluidity. Upon being subjected to the UV beam, the first cured dots with the prism pattern changes to have solidity. As a result, solid prism dots 760 are formed on the surface 714 of the body 710. The prism dots 760 each have the prism-shaped light reflecting surfaces, and the sizes and positions of the prism dots 760 may vary depending on those of the openings of the pattern mask 761 (referring to FIG. 13B).

Figure 14B:
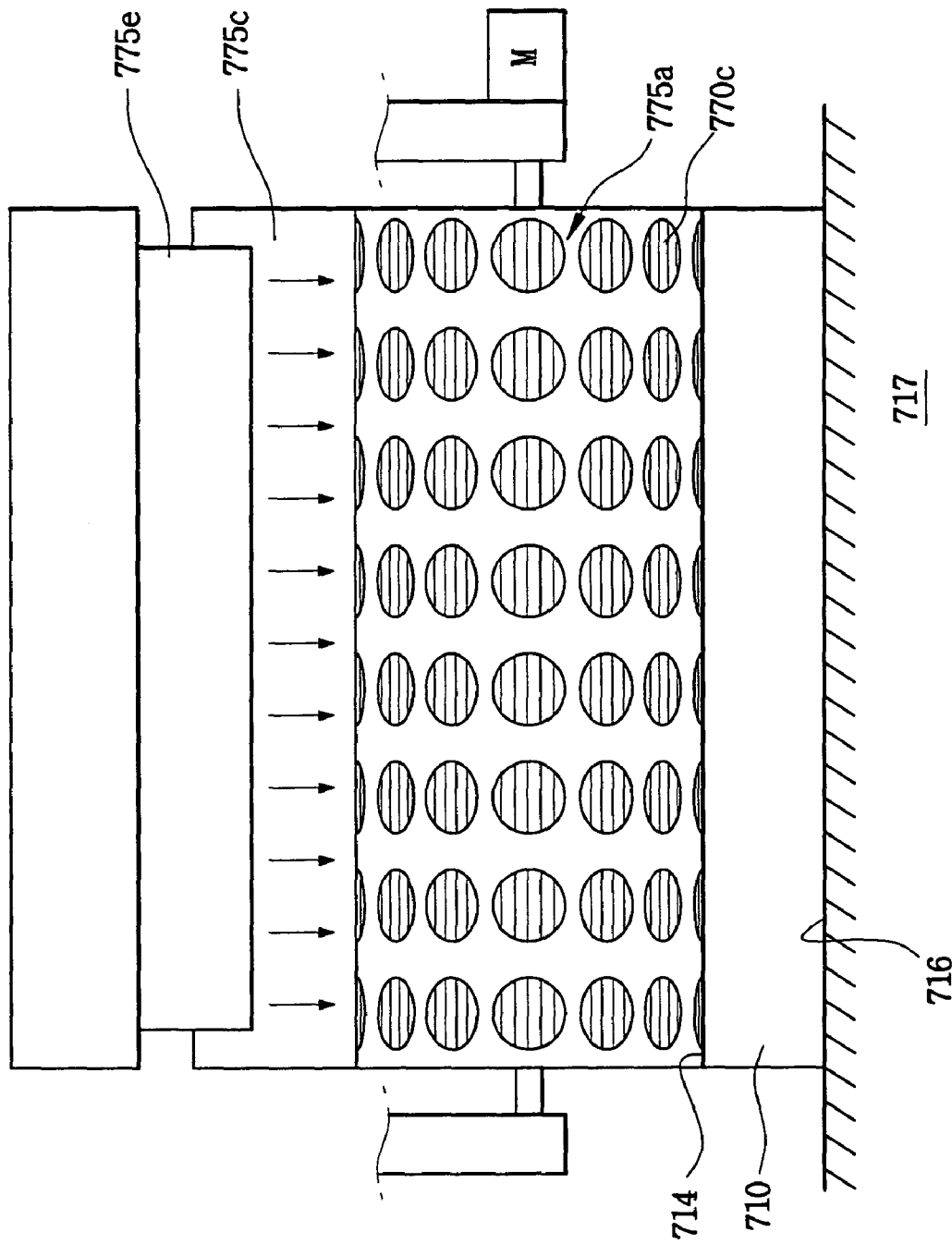
FIG. 14B is a front view of a pattern forming unit in FIG. 14A.

FIG. 14A shows a process and apparatus of fabricating the light guide plate according to another embodiment of the present invention. FIG. 14B is a front view of the embodiment taken in direction "A" in FIG. 14A. Referring to FIGS. 14A and 14B, a pattern forming unit 775 is disposed on the top surface of a light guide plate body 710 which is placed on a base 717. The pattern forming unit 775 has a roller 775a to be in contact with the surface of the body 710, a UV curable material dispenser 775b for discharging UV curable material 770a on the surface of the roller 775a, a scraper 775c for spreading and leveling the UV curable material 770a, a first UV beam radiator 775d for generating a first UV beam, and a second UV beam radiator 775e for generating a second UV beam.

The roller 775a is made of, for example, elastic material and has prism pattern recesses 775f each having a prism-shaped bottom. In other words, each of the prism pattern recesses 775f has on its bottom a prism pattern containing one or more prisms. Each prism of the prism pattern formed on the prism pattern recesses 775f has side surfaces elongated and aligned in a selected direction. These side surfaces of the prisms are formed corresponding to the light reflecting surfaces of the prism dots of the light reflection pattern (referring to FIGS. 1 and 3-5).

As the roller 775a rotates to proceed forward on the body 710, the UV curable material dispenser 775b discharges the UV curable material 770a to fill in the prism pattern recesses 775f on the surface of the roller 775a. The scraper 775c disposed next to the UV curable material dispenser has an end portion in contact with the surface of the roller 775a, so that the scraper 775c scrapes the UV curable material 770a dispensed and piled on the surface of the roller 775a. As a result, the prism pattern recesses 775f are filled with the UV curable material 770b having the same surface level as that of the roller 775a. The UV curable material 770a dispensed on the roller 775a but not filled into the recesses 775f is removed by the scraper 775c from the surface of the roller 775a.

The UV curable material 770b in the prism pattern recesses 775f are subjected to the first UV beam generated by the first UV beam radiator 775d. The first UV cured material 770c gains solidity and loses fluidity by being subjected to the first UV beam to the extent that it has adhesive properties.

As the roller 775a rotates to proceed forward, the first UV cured material 770c in the prism pattern recesses 775f becomes in contact with the surface 714 of the body 710. Since the first UV cured material 770c is adhesive, the first UV cured material 770c is separated from the recesses 775f and attached on the surface 714 of the body 710. It should be noted that the first UV cured material 770c gains adhesive properties by being subjected to the first UV beam to the extent that the adhesive force between the contacting surfaces of the first UV cured material 770c and the body 710 is greater than the adhesive force between the contacting surfaces of the first UV cured material 770c and the prism pattern recesses 775f. Thus, when the first UV cured material 770c becomes in contact with the surface 714 of the body 710, the contacting surfaces of the first UV cured material 770c and the recesses 775f are separated from each other and the top surface of the first UV cured material 770c adheres onto the surface 714 of the body 710.

The UV cured material 771 attached on the surface 714 of the body 710 is then subjected to the second UV beam generated by the second UV beam radiator 775e. Upon being subjected to the second UV beam, the UV cured material 771 on the body gains more solidity to become solid prism dots 770. Thus, the light guide plate body 710 has on its surface a light reflection pattern with the prism dots 770 each having the light reflecting surfaces. In this embodiment, the light reflection pattern is advantageously fabricated on the light guide body 710 in a single process.

Figure 15A:
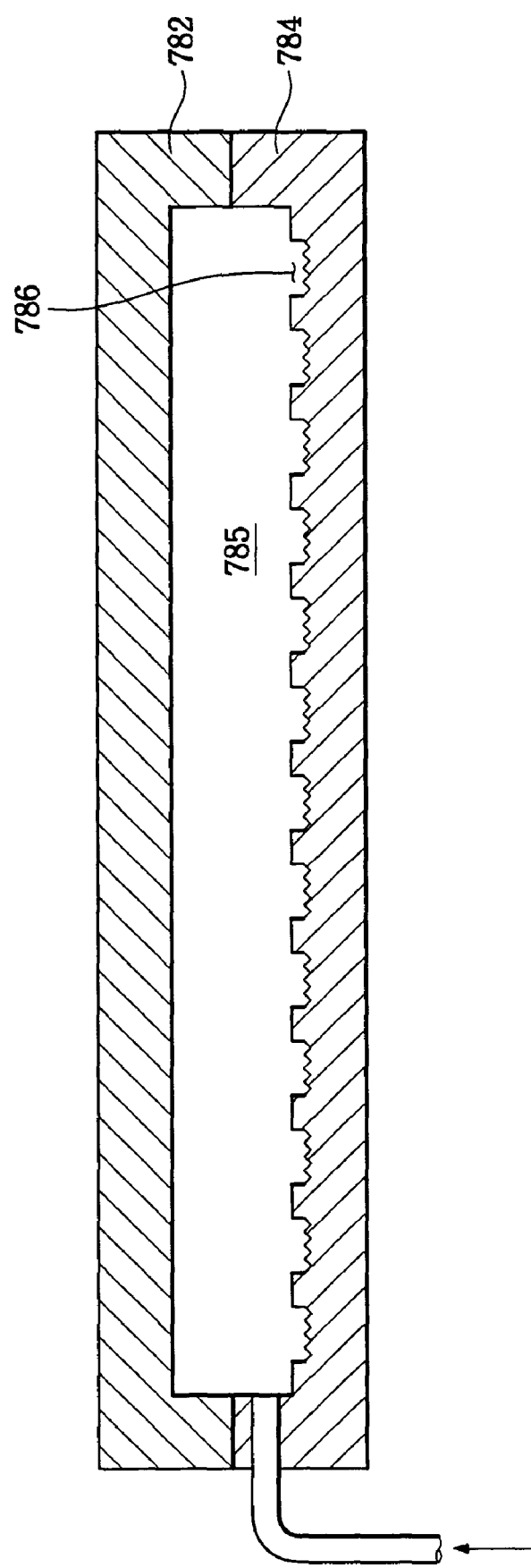
FIGS. 15A and 15B are schematic cross-sectional views of a molding apparatus for fabricating a light guide plate according to the present invention.
Figure 15B:
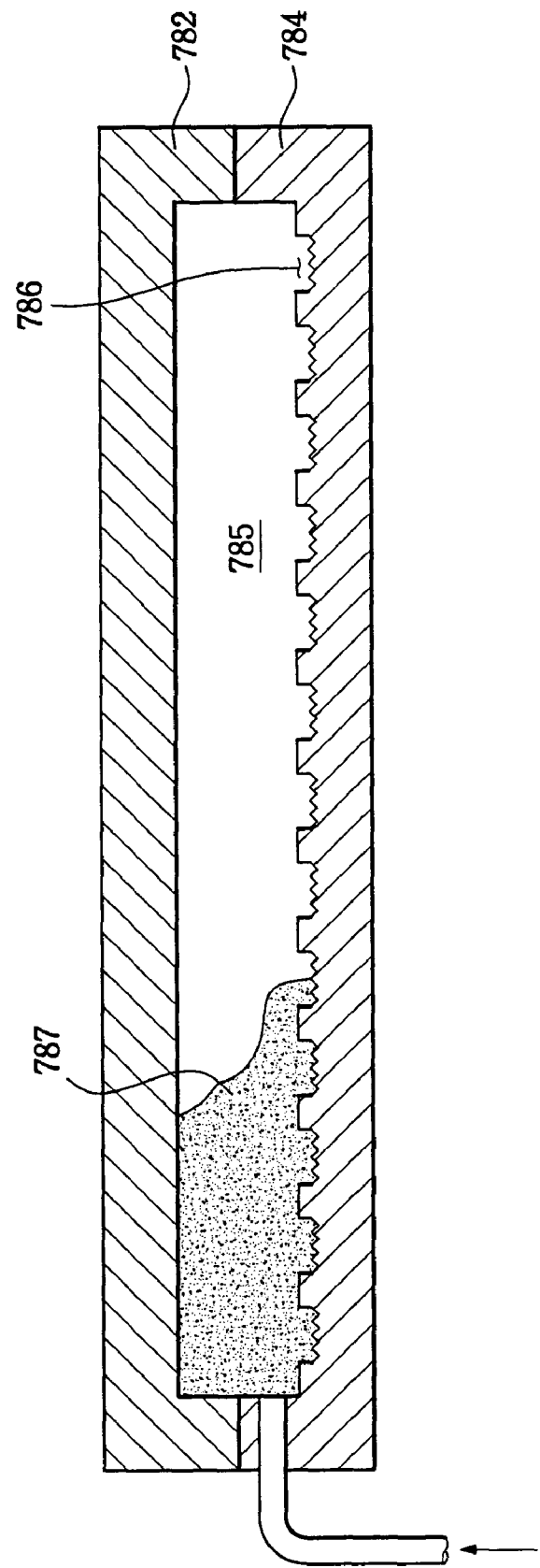

FIGS. 15A and 15B are schematic diagrams illustrating a molding process for fabricating a light guide plate according to another embodiment of the present invention. A molding apparatus of the present invention includes an upper mold 782 and a lower mold 784. The upper and lower molds 782, 784 are combined together so that an empty space is formed therein. The empty space consists of first and second hollows 785, 786 for forming a light guide plate body and prism dots of the light guide plate, respectively. In other words, the first hollow 785 has a shape and size identical with those of the light guide plate body, and the second hollow 786 has recesses with the prism pattern identical with that of a light reflection pattern of the light guide plate.

As shown in FIG. 15B, the first and second hollows 785, 786 in the molding apparatus are filled with indurative material 787, for example synthetic resin, provided through an inlet 788 of the molding apparatus. Once the resin is completely filled in the hollows 785, 786, the upper and lower molds 782, 784 are separated to produce a light guide plate with a light reflection pattern integrally formed thereon. Since the recesses of the second hollow 786 have the prism pattern, the prism dots of the light guide plate molded by the lower mold 784 have the same prism pattern on their surfaces.

There are advantages in this embodiment such that the molding process of the present invention allows of mass production of the light guide plate and facilitates fabrication of the light guide plate with highly complex shapes of the light reflection pattern.

Figure 16:
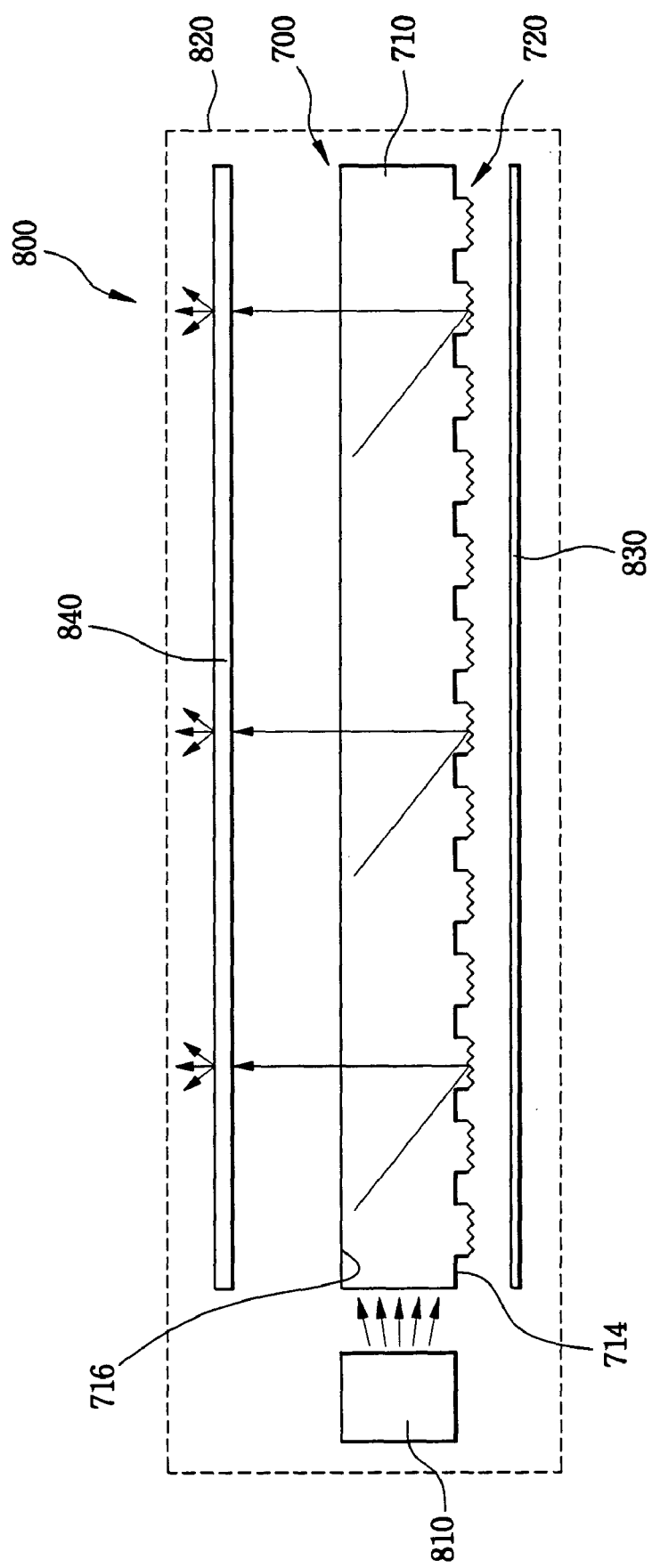
FIG. 16 is a schematic diagram illustrating a backlight assembly according to an embodiment of the present invention.

FIG. 16 a schematic diagram illustrating a backlight assembly according to an exemplary embodiment of the present invention. In FIG. 16, the parts equivalent to those shown in FIG. 1 are represented with like reference numbers and description thereof is omitted to avoid duplication.

The backlight assembly 800 has a light guide plate 700 with a body 710 and a light reflection pattern 720, a light source 810, and a receiving container 820. The light source for providing light to the light guide plate 700 is, for example, a light emitting diode or a discharge lamp. In this embodiment, a cold cathode fluorescent lamp with a cylindrical shape is employed to provide the light to the light guide plate 700. The receiving container 820 may have any shape appropriate for receiving the light guide plate 700 and the light source 810 therein. The receiving container 820 has side surfaces connected to the bottom to provide a receiving space in which the light guide plate 700 and the light source 810 are installed to be stationary.

The backlight assembly 800 may further include a reflection plate 830 under the light guide plate 700 and/or a diffusion sheet 840 above the light guide plate to improve use efficiency of the light. The reflection plate 830 reflects light leaked from the first surface 714 of the light guide plate 700 toward the light guide plate 700. The diffusion sheet 840 makes distribution of the light from the second surface 716 of the light guide plate 700 uniform so that light with uniform distribution is provided to a display panel (not shown). It should be noted, however, that the backlight assembly of the present invention may provide the light with the substantially same uniform distribution even in the absence of the diffusion sheet 840 because the light exiting the light guide plate of the present invention is substantially perpendicular to the second surface 716 owing to the light reflection pattern 720.

Figure 17A:
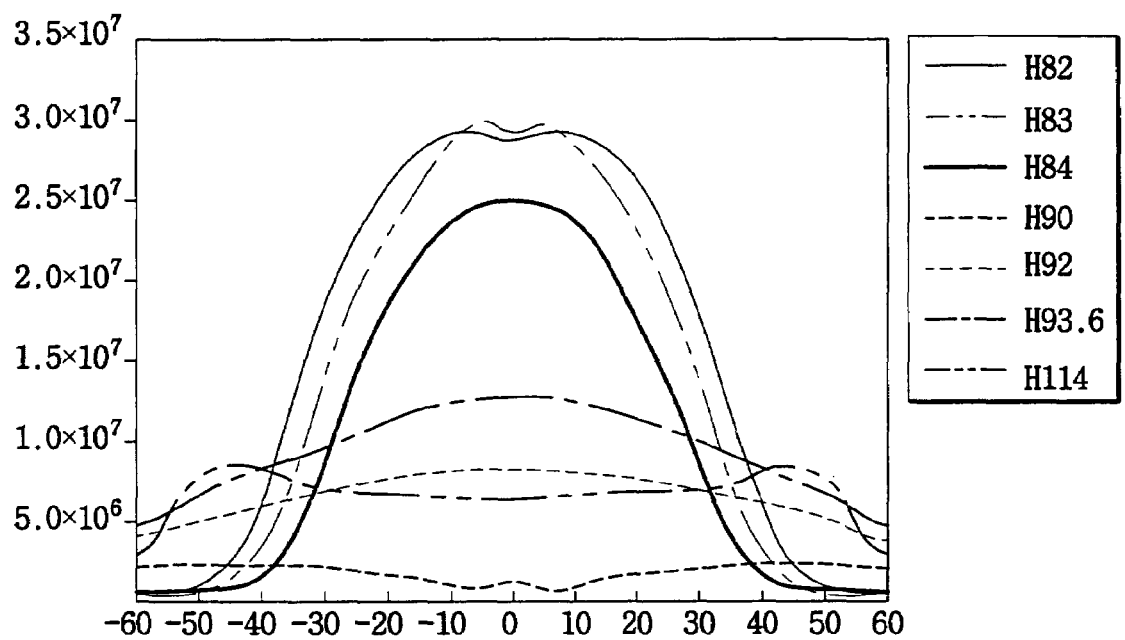
FIGS. 17A and 17B are graphs showing luminance measured on the light guide plate in FIG. 16.
Figure 17B:
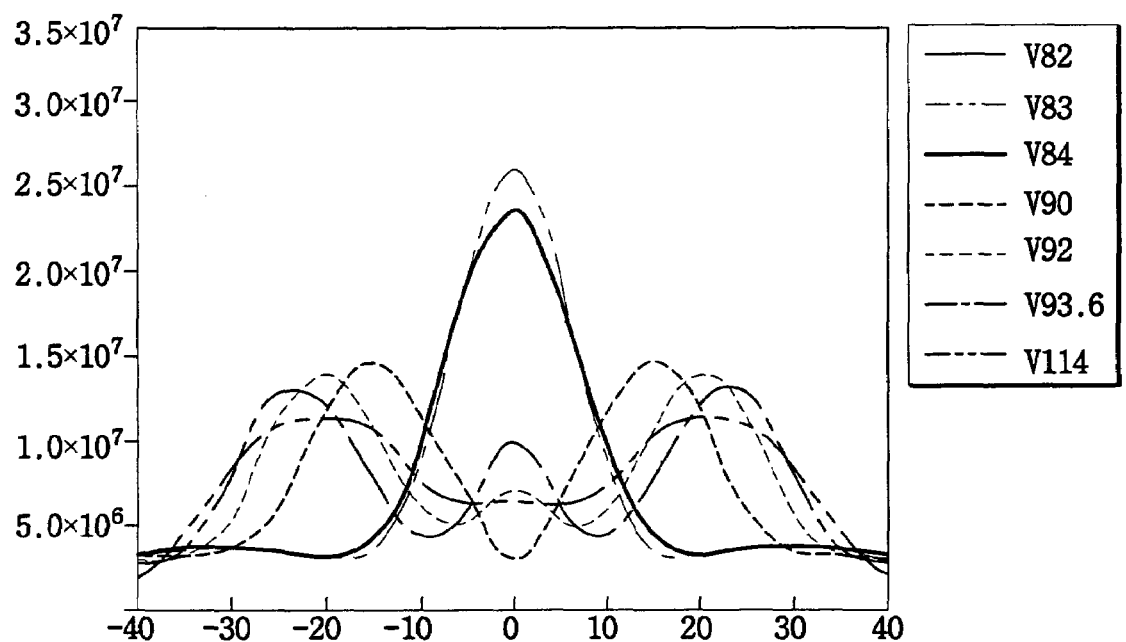

FIGS. 17A and 17B are graphs showing luminance on the second surface 716 of the light guide plate 700 in FIG. 16. The luminance measured on the light guide plate in the X-direction (referring to FIG. 6) is shown in FIG. 17A, and the luminance measured on the light guide plate in the Y-direction (referring to FIG. 6) is shown in FIG. 17B. The luminance varies in relation to values of viewing angles and the angle $\theta_3$ of the light reflecting surfaces 722, 724 of the prism dots (referring to FIG. 5).

In FIGS. 17A and 17B, the vertical axis represents values of the luminance, the horizontal axis represents values of the viewing angle, and the different graph lines each represent a different angle between the light reflecting surfaces of the prism dots. In this case, the angel between the light reflecting surfaces varies from about 80° to about 120°, and the luminance becomes maximized at the angle from about 82° to about 84°. In case that the angel between the light reflecting surfaces is smaller than about 80° or larger than about 120°, the luminance becomes too low to be used for appropriate display.

The graphs in FIGS. 17A and 17B show different viewing angles (i.e., the viewing angle in FIG. 17B is narrower than that in FIG. 17A). However, the viewing angles would become substantially same if the light guide plate employs the light reflection pattern shown in FIGS. 8 through 11A.

Luminance on the light guide plate of the present invention is compared with that on conventional light guide plates as follows:

TABLE 1

| Exemplary Embodiments | Average Luminance |
|---|---|
| Conventional light guide plate with three diffusion sheets | 3458 |
| Conventional light guide plate with one diffusion sheet and one prism sheet | 4423 |
| Conventional light guide plate with one diffusion sheet, one prism sheet, and DBEF film | 2824 |
| Light guide plate of the present invention with angle 82.5° between the light reflecting surfaces | 8709 |
| Light guide plate of the present invention with one diffusion sheet | 4950 |

In Table 1, the "average luminescence" is the average of luminance values measured at twenty-five locations on the light guide plate. As shown in Table 1, the luminance is much higher in the light guide plate of the present invention with angle 82.5° between the light reflecting surfaces than other types of light guide plates. This is because the light reflected by the light reflection pattern exits the surface of the light guide plate at the light emission angle substantially perpendicular to the surface of the light guide plate.

FIG. 18 is a schematic diagram illustrating a light guide plate applicable to the backlight assembly in FIG. 16. The light guide plate 750 in FIG. 18 has a light reflection pattern 780 different from the light reflection pattern 720 in FIG. 16. The light reflection pattern 780 has prism dots of which size and density vary depending on an area of the light guide plate 750. In this embodiment, for example, the sizes of the prism dots vary such that the closer a prism dot is to the light source 810, the smaller the prism dot is, and that the more distant a prism dot is from the light source 810, the larger the prism dot is. Also, the density of the prism dots on the light guide plate 750 varies such that the density of the prism dots in an area of the light guide plate 750 becomes higher as the area is located farther from the light source 810. In other words, the size of a prism dot is proportional to the distance between the prism dot and a light incident surface of the light guide plate 750, and the density of the prism dots in an area of the light guide plate 750 is also proportional to the distance between the area and the light incident surface.

Such configuration of the light reflection pattern 780 reduces luminance variation of the light provided by the light guide plate 750. Thus, the light guide plate 750 advantageously provides the light having uniform distribution.

Figure 19:
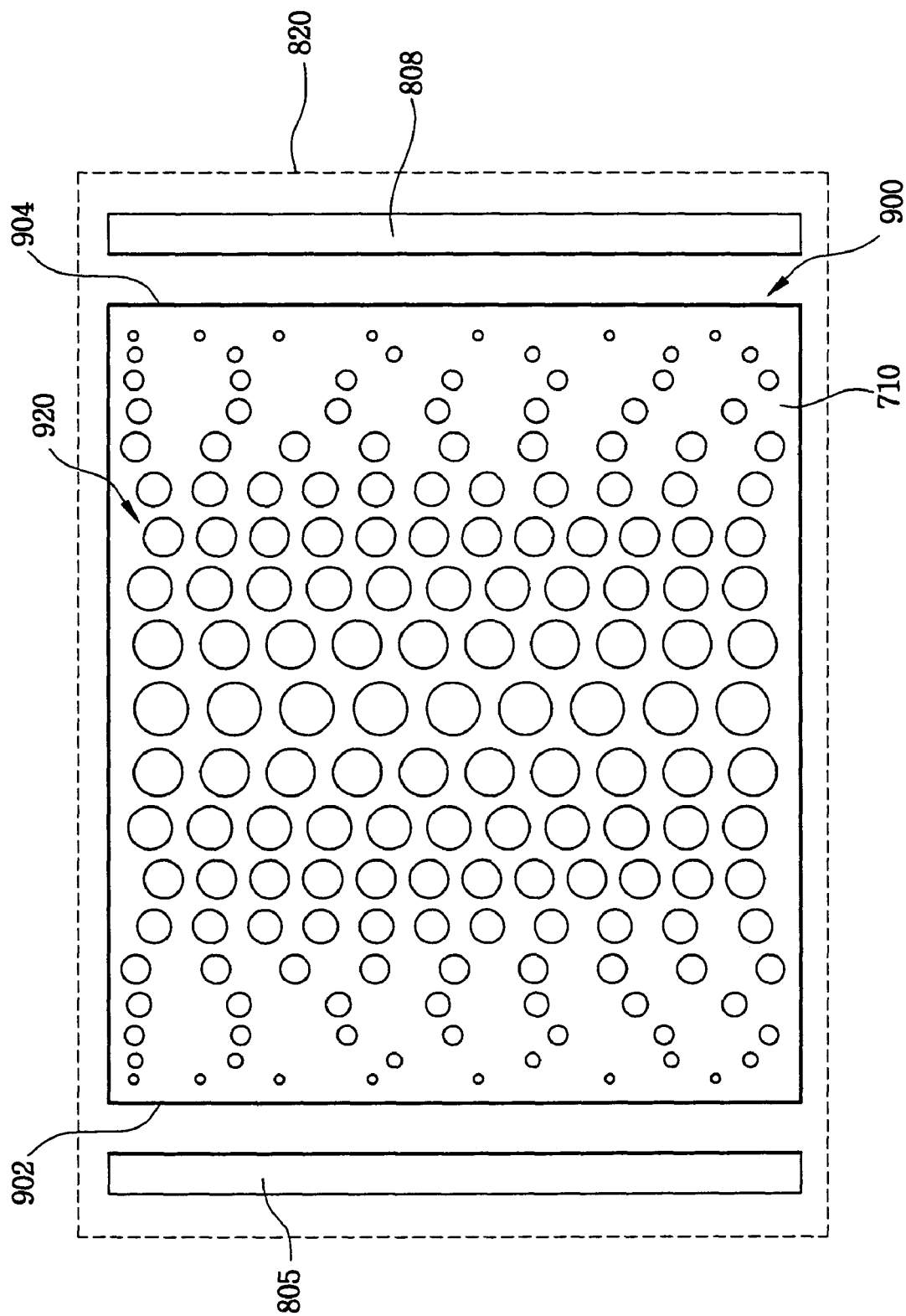
FIG. 19 is a schematic diagram illustrating a backlight assembly according to another embodiment of the present invention.

FIG. 19 shows a light guide plate applicable to a backlight assembly having multiple light sources according to another embodiment of the present invention. As shown in FIG. 19, the light guide plate 900 has two light incident surfaces 902, 904 onto which light is provided from the two light sources 805, 808, respectively. In this case, the quantity of light supplied from the first and second light sources 805, 808 vary depending on the location of an area in the light guide plate 900. In other words, the closer is an area on the light guide plate 900 to either the first or second light source, the greater is the quantity of light at the area. In like manner, the closer is an area on the light guide plate to the center of the light guide plate, the less is the quantity of light at the area. Such differences of the light quantity in different areas may cause luminance variation of the light provided from the light guide plate 900.

The light guide plate 900 in FIG. 19 prevents such and similar problems by compensating the luminance variation. The light guide plate 900 has a light reflection pattern 920 with prism dots of which sizes and density vary depending on an area in the light reflection pattern 920. In this embodiment, for example, the sizes of the prism dots vary such that the closer is a prism dot to either the first or second light source, the smaller the prism dot is, and that the more distant is a prism dot from both the first and second light sources 805, 808, the larger the prism dot is. Also, the density of the prism dots of the light reflection pattern 920 varies such that the closer is an area of the light reflection pattern 920 to either the first or second light source, the lower is the density of the prism dots at the area. As a result, the prism dots at the center between the light sources 805, 808 have the largest size and the highest density. Such configuration of the light reflection pattern 920 prevents or reduces the luminance variation between the side and central areas of the light guide plate 900.

Figure 20:
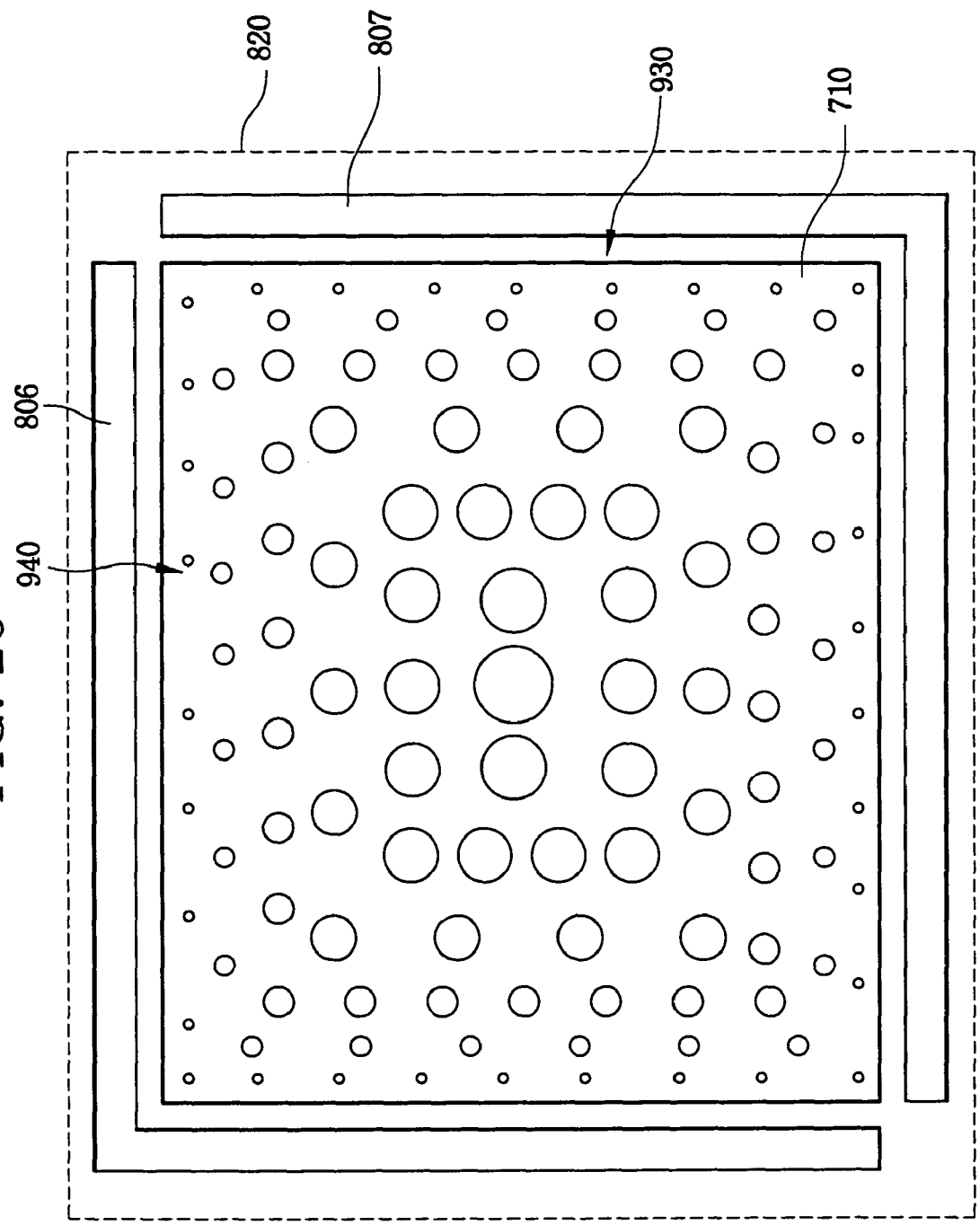
FIG. 20 is a schematic diagram illustrating a backlight assembly according to another embodiment of the present invention.

FIG. 20 illustrates a backlight assembly according to another embodiment of the present invention. In this embodiment, two light sources 806, 807 are disposed to provide light to all the side surfaces of a light guide plate 930, and a light reflection pattern 940 is formed on the surface of the light guide plate 930 to optimize the light provided from the light sources 806, 807.

The first and second light sources 806, 807 each have at least one bent portion (here, for example, an L-shaped bent portion) to cover all the side surfaces of the light guide plate 930. Where the light guide plate 930 has four side surfaces, the first light source 806 provides the light incident onto two side surfaces of the light guide plate 930, and the second light source 807 provides the light incident onto the other two side surfaces of the light guide plate 930. Assuming that the light guide plate 930 has no light reflection pattern, the luminance is not uniform in the light guide plate 930. The luminance at the central area is lower than that at the marginal area of the light guide plate 930.

The light reflection pattern 940 is configured to compensate such luminance variation in the light guide plate 930. As shown in FIG. 20, prism dots of the light reflection pattern 940 have different sizes such that the closer is a prism dot to one of the side surfaces, the smaller the prism dot is. In like manner, the closer is a prism dot to the center of the light guide pattern, the larger the prism dot is. The largest dot may be formed at the center of the light guide plate 930. Accordingly, the density of the prism dots at an area closer to the center of the light guide plate 930 is higher than that at an area closer to the first or second light source. The light reflection pattern 940 prevents or reduces luminance variation between the central and marginal areas of the light guide plate 930.

Figure 21:
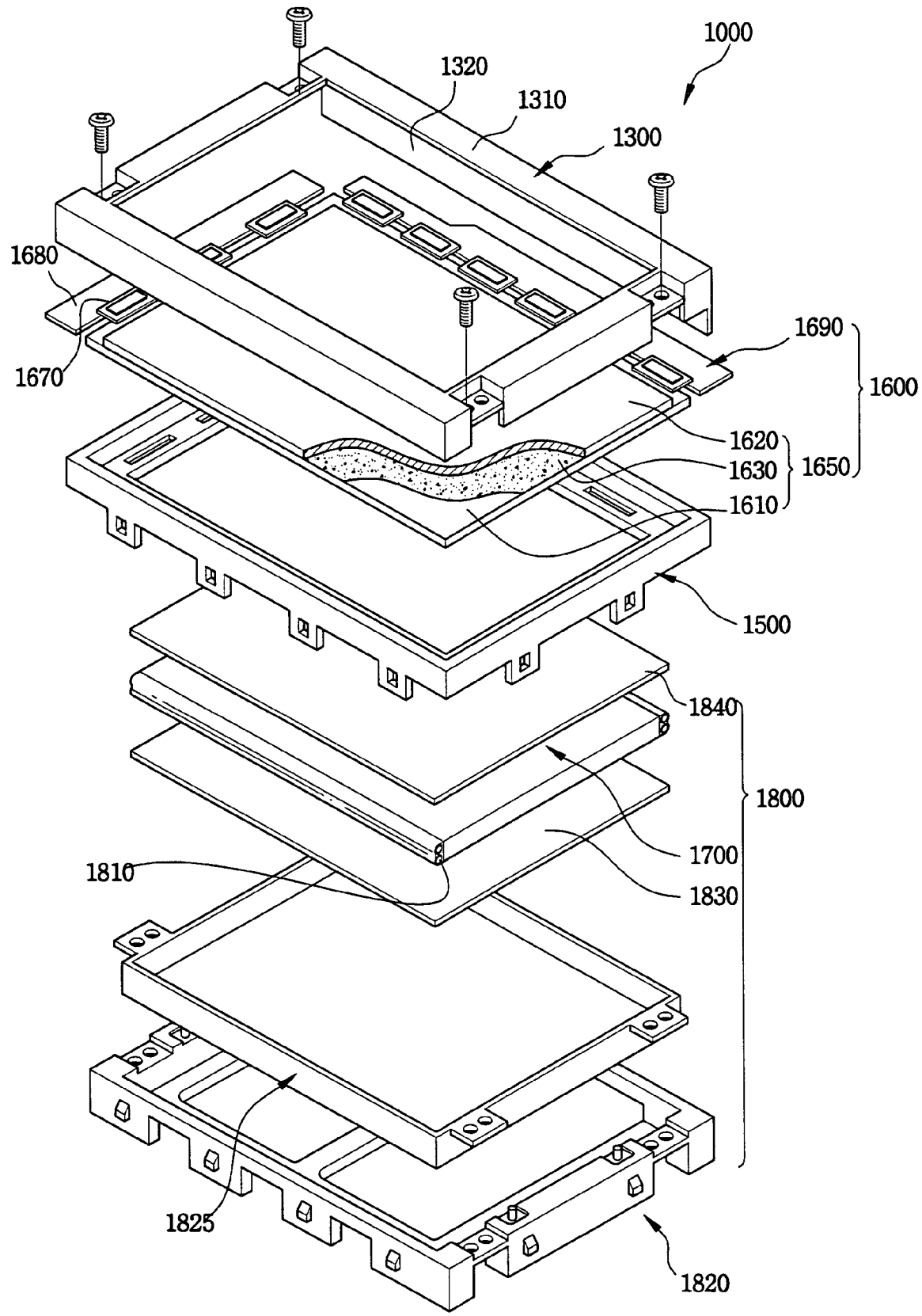
FIG. 21 is an exploded perspective view of a liquid crystal display (LCD) device according to an embodiment of the present invention.

FIG. 21 is an exploded perspective view of a liquid crystal display (LCD) device according to an exemplary embodiment of the present invention. The LCD device 1000 employs a back light assembly 1800 which may be one of the embodiments shown in FIGS. 16 through 20. The LCD device 1000 also includes an LCD panel assembly 1600, a light guide plate 1700, a receiving container 1820, and a diffusion sheet 1840. The receiving container 1820 receives a bottom chassis 1825 that receives a light source 1810 and a reflection plate 1830.

The LCD panel assembly 1600 is disposed on a middle chassis 1500 over the backlight assembly 1800 and includes an LCD panel 1650 and a drive module 1690. Electrical signals with image information are provided to the LCD panel assembly 1600 and images are displayed on the LCD panel 1650. For this image display, the LCD panel 1650 includes a TFT (thin film transistor) substrate 1610, a liquid crystal layer 1630, and a color filter substrate 1620, and the TFT substrate 1610 is connected with the driver module 1690.

The driver module 1690 includes a printed circuit board (PCB) 1680 and a tape carrier package 1670. The PCB 1680 has a function of transforming signals externally provided into image signals to be displayed on the LCD panel 1650 by means of the components of the LCD device. For example, the tape carrier package 1670 provides the TFT substrate 1610 with the timing signals from the PCB 1680 in accordance with a certain timing scheme.

The LCD panel 1650 is disposed on the middle chassis 1500 in such a manner that it is movable in the vertical direction but unmovable in the horizontal direction with respect to the backlight assembly 1800. The LCD panel 1650 also includes a fragile substrate (e.g., glass substrate) that may be damaged by an external impact. Thus, a chassis 1300 is employed in the LCD device to protect the LCD panel 1650 from an external impact and secure the LCD panel 1650 on the backlight assembly 1800. The chassis 1300 includes a pressing surface 1310 for securing the LCD panel 1650 on the backlight assembly 1800 by pressing down the edge of the LCD panel 1650 and a fixing surface 1320 for fixing the pressing surface 1310 onto the receiving container 1820. For example, the fixing surface 1320 is assembled with the receiving container 1820 by means of a hook connection.

While the invention has been described with reference to the preferred embodiments, it will be understood by those skilled in the art that various changes may be made and equivalents may be substituted for elements thereof without departing form the scope of the invention. In addition, many modifications may be made to adapt a particular situation or material to the teachings of the invention without departing from the essential scope thereof. Therefore, it is intended that the invention may not be limited to the particular embodiment disclosed as the best mode contemplated for carrying out this invention, but that the invention will include all embodiments falling within the scope of the intended claims.

What is claimed is:

1. A light guide plate comprising:
   a light incident surface for receiving light; and
   first and second light emission surfaces for emitting light;
   wherein the first emission surface includes a plurality of circular cylinder-shaped protrusions having grooves.

2. A light guide plate comprising:
   a light incident surface for receiving light;
   first and second light emission surfaces for emitting light at a first light emission angle with respect to the first and second light emission surfaces;
   a protrusion part formed as a column shape on the first light emission surface; and
   a light reflection pattern formed on an upper surface of the protrusion part, for reflecting light toward the second light emission surface, the light reflection pattern having a cross-sectional profile of a plurality of V-shaped grooves, wherein each of the V-shaped grooves are elongated in a specific direction, the direction aligned substantially parallel with the light incident surface and each of the plurality of V-shaped grooves is disposed adjacent to another V-shaped groove.

3. The light guide plate of claim 2, wherein the protrusion parts are formed integrally with the first light emission surface.

4. The light guide plate of claim 2, wherein the protrusion part includes a plurality of protrusion parts and the protrusions are positioned with different densities at different areas on the first light emission surface such that a density of the protrusion parts increase as a distance from the light incident surface increases.

5. The light guide plate of claim 4, wherein the protrusion parts have different sizes such that a size of the protrusion parts increases as a distance from the light incident surface increases.

6. The light guide plate of claim 4, wherein the protrusion parts have a substantially identical size, and a number of the protrusion parts at a unit area closer to the light incident surface is smaller than a number of the protrusion parts at a unit area farther from the light incident surface.

7. A light guide plate comprising:
   a light incident surface for receiving light;
   first and second light emission surfaces for emitting light; and
   a light reflection pattern formed on the first light emission surface, for reflecting light toward the second light emission surface, the light reflection pattern including a plurality of dots, wherein the dots each have light reflecting surfaces elongated in a selected direction, wherein adjacent ones of the light reflecting surfaces meet each other at elongated edges of the adjacent light reflecting surfaces to form an angle between the adjacent reflecting surfaces.

8. The light guide plate of claim 7, wherein the angle between the adjacent reflecting surfaces is in a range from about 80° to about 120°.

9. The light guide plate of claim 7, wherein the angle between the adjacent reflecting surfaces is in a range from about 82° to about 84°.

10. The light guide plate of claim 7, wherein the light reflecting surfaces are aligned in a direction parallel with the light incident surface.

11. The light guide plate of claim 7, wherein the light reflecting surfaces each have at least one bent portion.

12. The light guide plate of claim 7, wherein the light reflecting surfaces are formed on the surface of the dots in a concave shape.

13. The light guide plate of claim 7, wherein the light reflecting surfaces are formed on the surface of the dots in a convex shape.

14. The light guide plate of claim 7, wherein the dots of the light reflection pattern are formed integrally on the first light emission surface.

15. The light guide plate of claim 7, wherein the dots of the light reflection pattern are formed on a separate sheet attached on the first light emission surface.

16. The light guide plate of claim 7, wherein the light reflection pattern is made of material having a refraction index same as that of material of a body of the light guide plate.

17. The light guide plate of claim 7, wherein the light reflection pattern has different densities of the dots at different areas on the first light emission surface such that the closer is an area of the light reflection pattern to the light incident surface, the lower is a density of the dots at the area.

18. The light guide plate of claim 17, wherein the dots have different sizes such that the more distant is a dot from the light incident surface, the larger is the dot.

19. The light guide plate of claim 17, wherein the dots have a substantially identical size, and a number of the dots at a unit area closer to the light incident surface is smaller than a number of the dots at a unit area farther from the light incident surface.

20. The light guide plate of claim 7, wherein the dots of the light reflecting pattern include first dots having the light reflecting surfaces aligned in a first direction and second dots having the light reflecting surfaces aligned in a second direction.

21. The light guide plate of claim 20, wherein the first direction is parallel with the light incident surface and the first and second directions are perpendicular to each other.

22. The light guide plate of claim 20, wherein the first direction is parallel with the light incident surface and the second direction is one of random directions independent of the first direction.

23. The light guide plate of claim 20, wherein the first dots are arranged in a matrix form, and the second dots are each interposed between adjacent ones of the first dots. _pg,44

* * * * *